United States Patent
Barthel

(10) Patent No.: US 8,682,829 B2
(45) Date of Patent: Mar. 25, 2014

(54) DETERMINING THE OCCURRENCE OF EVENTS USING DECISION TREES

(75) Inventor: Knut Barthel, Waldorf (DE)

(73) Assignee: SAP Aktiengesellschaft, Walldorf (DE)

( * ) Notice: Subject to any disclaimer, the term of this patent is extended or adjusted under 35 U.S.C. 154(b) by 819 days.

(21) Appl. No.: 12/366,561

(22) Filed: Feb. 5, 2009

(65) Prior Publication Data
US 2009/0138389 A1 May 28, 2009

Related U.S. Application Data

(62) Division of application No. 10/377,275, filed on Feb. 28, 2003, now abandoned.

(51) Int. Cl.
| | | |
|---|---|---|
| *G06F 17/00* | (2006.01) | |
| *G06F 17/22* | (2006.01) | |
| *G06Q 20/00* | (2012.01) | |
| *G06N 5/04* | (2006.01) | |
| *G06Q 40/00* | (2012.01) | |
| *G06Q 20/20* | (2012.01) | |

(52) U.S. Cl.
CPC ............... *G06N 5/04* (2013.01); *G06Q 40/103* (2013.01); *G06Q 20/207* (2013.01)
USPC ................... 706/46; 705/31; 705/19; 706/60

(58) Field of Classification Search
None
See application file for complete search history.

(56) References Cited

U.S. PATENT DOCUMENTS

| 5,546,507 | A | * | 8/1996 | Staub ............................. 706/60 |
| 5,819,249 | A | | 10/1998 | Dohanich et al. |
| 5,987,429 | A | * | 11/1999 | Maritzen et al. ................ 705/31 |
| 6,112,190 | A | | 8/2000 | Fletcher et al. |
| 6,456,619 | B1 | | 9/2002 | Sassin |
| 6,912,508 | B1 | | 6/2005 | McCalden et al. |

FOREIGN PATENT DOCUMENTS

EP 1227419 * 7/2002 .............. G06F 17/60

OTHER PUBLICATIONS

Summons to attend oral proceedings pursuant to Rule 115(1) EPC for Application No. EP 04 715 263.2-2211, dated Mar. 23, 2011, 9 pages.
Müller-Boré & Partner, Response to European Action for Application No. EP 04 715 263.2-2211, filed Sep. 30, 2009, 18 pages.
Online documentation for SAP CRM 3.0 software solution Transaction Tax Functionality, released Oct. 2001, 39 pages.

* cited by examiner

*Primary Examiner* — F. Zeender
*Assistant Examiner* — Denisse Ortiz Roman
(74) *Attorney, Agent, or Firm* — Fish & Richardson P.C.

(57) ABSTRACT

The determination of whether an event, such as a taxable event for a commercial transaction, has occurred uses an executable decision tree. The decision tree includes a number of test nodes that each include a comparison field and at least one allowed value. A data value associated with the comparison field is accessed and compared to the allowed values. If the comparison field equals an allowed value, execution proceeds to a child node, and if not, execution proceeds to a sibling node. The child and sibling nodes are either another test node, a result node, or an error node. Execution of the decision tree proceeds until a result node or an error node is reached.

17 Claims, 20 Drawing Sheets

DETERMINING THE OCCURRENCE OF EVENTS USING DECISION TREES

CROSS-REFERENCE TO RELATED APPLICATIONS

This application is a divisional and claims the benefit of priority of U.S. application Ser. No. 10/377,275, filed Feb. 28, 2003. The disclosure of this prior application is incorporated by reference herein.

TECHNICAL FIELD

This application relates to determining whether events, such as taxable events arising from commercial transactions, have occurred using decision trees.

BACKGROUND

Computer systems are often used to determine the tax consequences of a commercial transaction. Specifically, they are often used to make a tax determination, which involves a determination as to whether the commercial transaction resulted in a taxable event, and if so, what type of taxable event has resulted and to what taxing authority is a tax owed. In addition, computer systems are often used to perform the calculation of the amount of taxes that are owed.

There are many different types of transaction taxes and many different taxing authorities. It is desirable in some cases to have tax determination application software capable of handling tax determinations for a variety of different transaction taxes and a variety of different taxing authorities. To do this, a tax determination application software module may be designed so that it can be called from different applications that handle different types of commercial transactions.

The desirability of having tax determination application software being capable of handling many different transaction taxes is important from the perspective of an end user who conducts a wide variety of different commercial transactions that give rise to the different taxes. This capability is also important from the perspective of a software vendor who wants to make available for customers a high degree of pre-configured tax determination capability, even though any one customer may only use the software to handle a limited number transaction taxes.

One challenge in designing tax determination application software having broad functionality in terms of the number of different transaction taxes it can handle lies in developing (and perhaps even more importantly, maintaining) the software code that embodies the tax rules for the many different tax determinations. This is because tax rules are complicated and often change. A tax expert may be needed to design, develop and maintain the software that implements the tax rules, but in many cases tax experts do not have much experience in coding software.

SUMMARY

Generally, the invention, in one aspect, provides the capability to perform determinations as to the occurrence of a wide variety of different events using executable decision trees that are easily developed and maintained. One area where the invention may find specific applicability is in determining the tax consequences of commercial transactions. The invention may also find applicability in any kind of decision which needs a high flexibility of configuration and which typically has a high number of variables on which the determination depends.

In one aspect, a computer program product, tangibly embodied in an information carrier, determines whether an event has occurred using a decision tree. The computer program product is operable to cause data processing apparatus to proceed to and execute a first of at least one test node of the decision tree. Each of the at least one test node includes a comparison field and at least one allowed value. The execution of each of the at least one test node includes accessing a data value associated with the comparison field, and determining whether the accessed comparison field data value is equal to the at least one allowed value. If the comparison field data value equals any of the at least one allowed value, execution proceeds to a child node of the test node. Otherwise, execution proceeds to a sibling node of the test node. The child and sibling nodes are either another test node, a result node, or an error node. The computer program product is also operable to cause data processing apparatus to execute any further test node to which execution of the decision tree proceeds until execution proceeds to a result node or an error node.

In different implementations, the events that correspond to the plurality of decision trees may be taxable events arising from a commercial transaction, and the test nodes may represent a question that forms the basis for a determination of whether or not the taxable event has occurred. Alternatively, the event may be a fiscal code as must be printed on invoices in Brazil, an identification of a delivering plant according to certain optimization rules, an identification of bank and payment method for settlement. The computer program product may also be further operable to cause data processing apparatus to identify for execution a set of a plurality of decision trees stored in a decision tree repository, wherein each decision tree corresponds to a different event, and then execute each of the identified set of decision trees as described. Each of the plurality of decision trees stored in the repository may embody a form comprising a mark-up language, such as an extensible mark-up language, or XML. Each of the at least one test node may represent a question that forms a basis for a determination of whether or not the taxable event has occurred.

In another aspect, a repository of a plurality of executable decision trees is provided in a system that determines which of a plurality of different taxable events have occurred for a commercial transaction. Each tree determines whether a different taxable event has occurred. Each tree includes at least one executable test node. Each executable test node includes a question to be answered in a determination of whether or not the taxable event corresponding to the tree has occurred. Also, each executable test node, when executed using information about a specified commercial transaction, yields an answer in one of a first form or a second form. An answer in the first form causes a child node to be executed, and an answer in the second form causes a sibling node to be executed. Each child and sibling node is either another test node, a result node or an error node. Each executable test node also includes at least two result nodes corresponding to a determination of whether the taxable event corresponding to the tree has occurred.

Each decision tree may correspond, for example, to a transaction tax type. The transaction tax type for one of the at least one decision trees may be a value added tax or a use tax, to name just a few examples. Also, a decision tree corresponding to a transaction tax of a specified type is able to determine whether or not a taxable event of the specified type has occurred in a plurality of taxing locations.

In yet another aspect, a computer-implemented method generates a user interface for developing and maintaining a decision tree. The method associates a decision tree with a series of user interfaces to request decision tree information from a user, displays each user interface in the series of user interfaces associated with a particular decision tree, receives decision tree information from a user using at least one of the user interfaces, and stores the decision tree information received from the user. The decision tree is a series of nodes, with each node being one of a test node, a result node, or an error node.

The user interface may be expandable and collapsible to display the nodes in the decision tree. The method may include the ability to add a reference to a data field in another system and a list of values.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
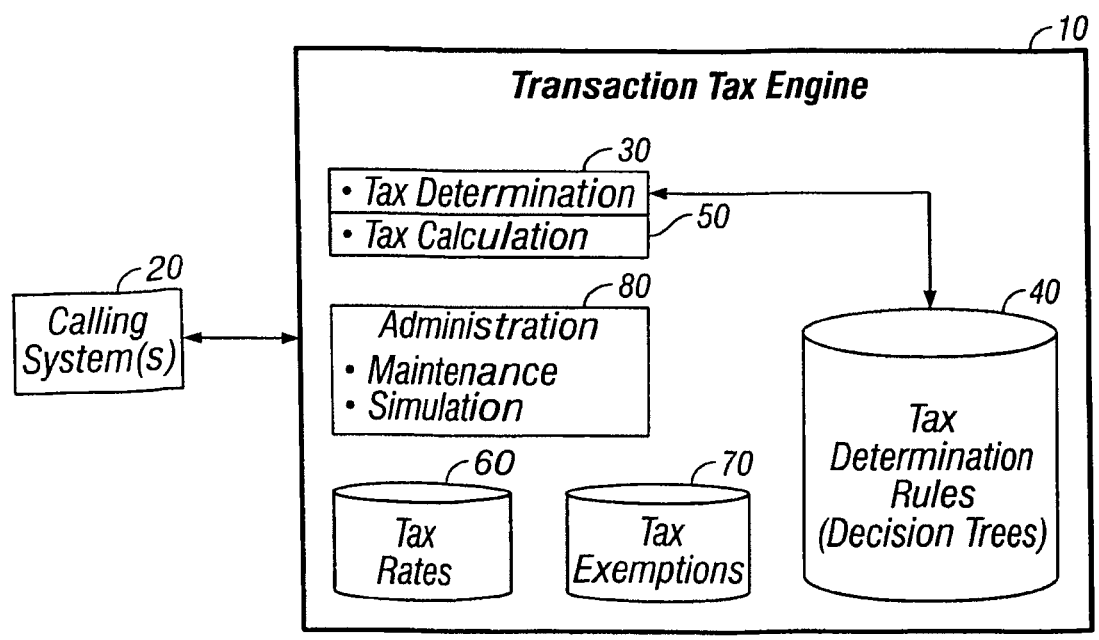
FIG. 1 is a block diagram of a system incorporating various aspects of the invention.

A transaction tax engine (TTE) 10, shown in FIG. 1, is a computing system that makes a tax determination for a commercial transaction. The tax determination includes determining whether a taxable event has occurred, what type of taxable event has occurred, and to what taxing authority a tax is owed. Some examples of taxable events for a transaction include a value added tax (VAT), a sales tax, and a use tax. In some cases, a transaction may result in more than one taxable event. After making the tax determination, the TTE 10 in the FIG. 1 example also calculates an amount owed in taxes for each taxable event.

In the FIG. 1 implementation, the TTE 10 is a stand-alone system that may be called from various calling systems 20. By way of example, the TTE 10 may be called from a sales transaction system or from a billing system, to name a few. As such, the TTE 10 may serve as a single system to make tax determinations and calculations for a wide variety of different transaction taxes and for a number of different taxing authorities (countries, states, provinces, etc.). In other implementations, the TTE 10 may be a part of a single system that both executes a transaction and performs the tax determination and calculation.

A tax determination module 30 in the TTE 10 performs the function of determining which taxable events have occurred. To do this, the tax determination module 30 uses executable tax determination rules stored in a repository 40. The rules stored in the repository 40 are in the form of executable decision trees. In one implementation, there is a different decision tree for each type of transaction tax and for each taxing authority. For example, there may be one decision tree for a VAT for Germany, one decision tree for a sales tax in the U.S. state of California, one decision tree for a use tax in the U.S. state of Washington, etc. The repository 40 in this implementation is located within the TTE 10. In other implementations, the repository 40 may be located elsewhere in a networked environment, but accessible by the TTE 10. For example, the repository 40 may be in a separate computer system that is maintained by a vendor who develops decision trees for various different transaction taxes, and then allows them to be accessed. Alternatively, decision trees that are designed, developed and maintained by vendors may be uploaded to the TTE 10 and stored in repository 40, as will be described later.

A tax calculation module 50 in the TTE 10 performs the calculation of taxes. To do this, the tax calculation module 50 uses different calculation procedures for each of the different taxes that may need to be calculated. Also, the module 50 accesses information stored in a tax rate repository 60 and in a tax exemptions repository 70. In the FIG. 1 example, the tax calculation module 50 is a part of the TTE 10. In other implementations, the module 50 may be located elsewhere, and called by the TTE 10. An administration module 80 is also a part of the TTE 10 in the FIG. 1 implementation. The administration module 80 allows maintenance to be performed on the TTE 10, such as the creation and revision of the tax decision trees that are stored in the rules repository 40. This is described in more detail later. Module 80 also controls the performance of tax simulations.

Figure 2:
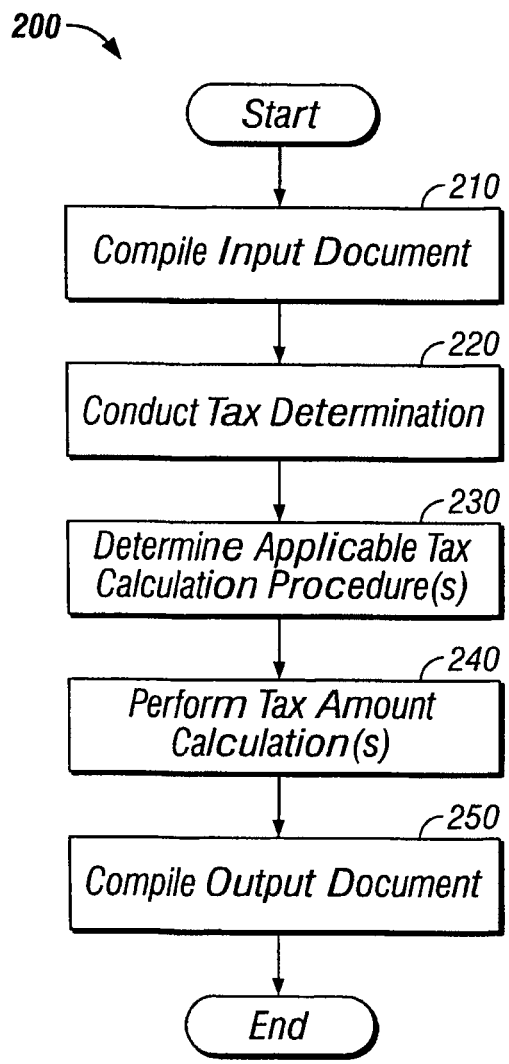
FIG. 2 is a flowchart of a process for making tax determinations and calculations, which may be performed by a system such as the system shown in FIG. 1.

Referring to FIG. 2, a method 200 that the TTE 10 in FIG. 1 may use to determine and calculate transaction taxes starts with a remote function call from the calling system 20. When this occurs, the TTE 10, at step 210, compiles an input document. The input document contains all of the information needed to make the tax determinations and to make any tax calculations that may need to be made. The input document may be compiled, for example, by extracting data from the calling system 20 or from any other system that contains the needed data.

The next step 220 is to conduct the tax determination. To do this, the tax determination module 30 (FIG. 1) first uses the input document to determine which of the tax decision trees should be executed. For example, if the input document indicates that the transaction occurred within the jurisdiction of a single taxing authority (for example, entirely within Germany), then the tax determination module 30 will identify all of the tax decision trees for that taxing authority for execution. If, however, the transaction occurs within several jurisdictions (for example, because the parties to the transaction are from different jurisdictions), then the tax determination module 30 will identify all applicable decision trees. For example, if there is a transaction involving both Germany and France, all applicable German and French decision trees will be taken into account, although of course not all of the decision trees need lead to a taxable event. For example, in the example transaction involving Germany and France, the result may be that there is a taxable event in Germany, but not in France. These results are determined by the content of the decision tree, and are taken into consideration by the designer of the tree. After identifying the decision trees to be executed, the tax determination module 30 causes the execution of each of the identified tax decision trees (in this example, each of the tax decision trees for Germany transaction taxes) to determine if any taxable events have occurred.

Next, at step 230, the TTE 10 determines which tax calculation procedure is to be executed to make the tax calculation. After this has been done, the tax calculation module 50 is called, and more specifically the determined tax calculation procedure is called, and then the called procedure makes the tax calculation (at step 240). At step 250, an output document is compiled, which may contain, for example, information regarding the type of tax that is owed, the taxing authority to which the tax is owed, and the amount in taxes due. For some transactions, more than one type of tax may arise, and thus the output document may provide a summary of information for all taxes due. The output document may be sent back to the calling system 20 or to another system designed to receive the information.

Figure 3:
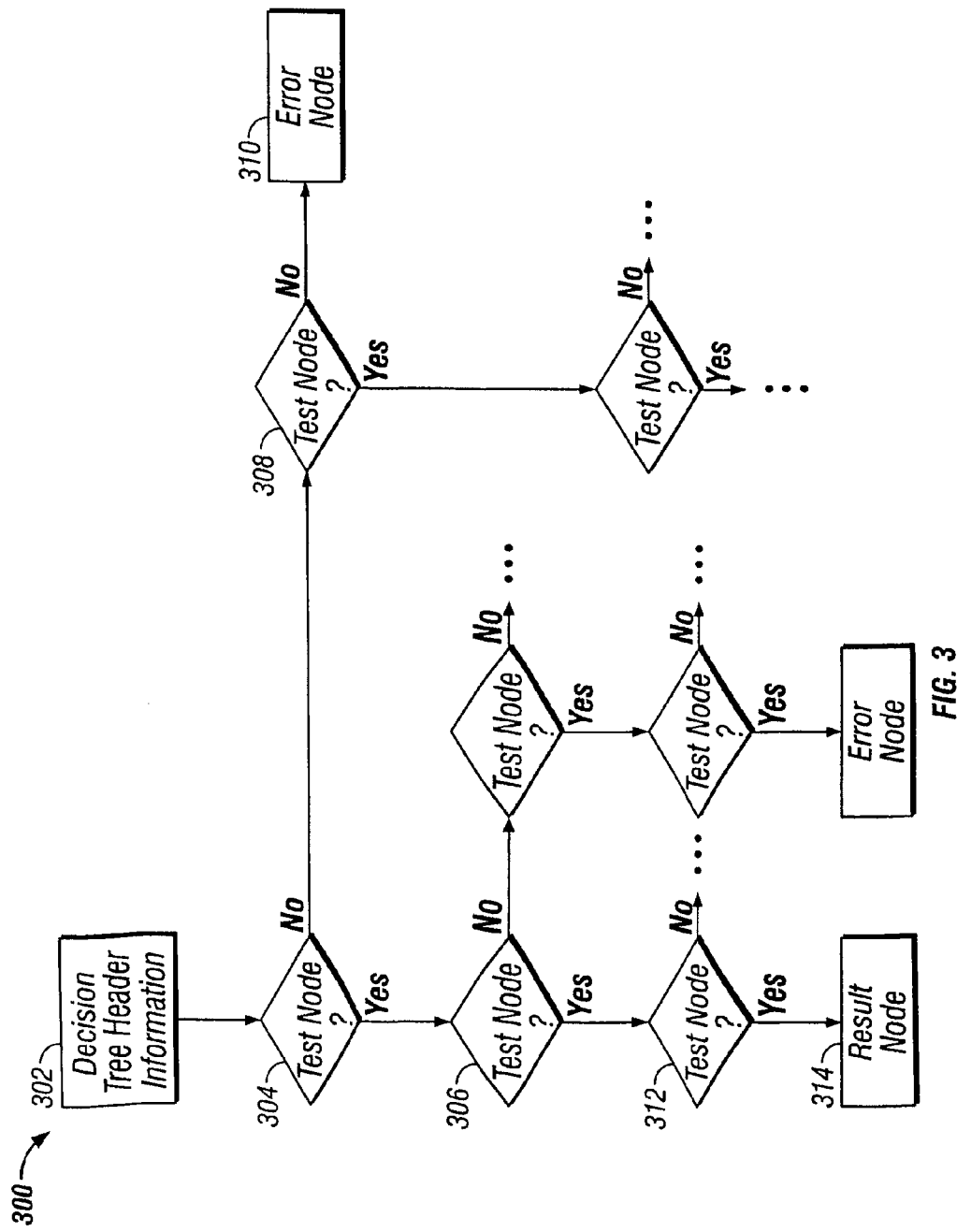
FIG. 3 is a figure illustrating a generic structure for an executable decision tree, which may be used in a system such as the system shown in FIG. 1.

FIG. 3 is a flowchart for a generic version of an executable tax decision tree 300. FIG. 3 illustrates a design methodology for the decision tree, which may be applied to all decision trees developed for a particular system. For example, the tax determination rules repository 40 (FIG. 1) may include many different tax decision trees, all designed according to the methodology illustrated in FIG. 3. As discussed previously, there may be, for example, one tax decision tree for a VAT for Germany, one decision tree for a sales tax in the U.S. state of California, one decision tree for a use tax in the U.S. state of Washington, etc.

The decision tree 300 has header information 302, which uniquely identifies the decision tree so that it may be called for execution from among all decision trees in the repository 40. In the FIG. 3 example, the header information 302 also points to a test node 304, which serves as a starting point in a tax determination using the tree. Test node 304, similar to other test nodes in the decision tree 300, includes a question that needs to be determined as part of the tax determination. For example, in the case of a tax determination for Germany VAT, one question may be whether the transaction is a service transaction.

The form of the answer to the question for a test node is either "yes" or "no." If the answer to the test node is "yes," execution of the decision tree proceeds to a child node. If the answer is "no," execution proceeds to a sibling node. Therefore, if the answer to test node 304 is "yes," then the execution of the decision tree proceeds to another test node 306, which is a child node to test node 304. On the other hand, if the answer to test node 304 is "no," then execution proceeds to test node 308, which is a child node to test node 304. Test nodes 306 and 308 are similar to test node 304 in that they include a tax related question in a "yes" or "no" format, and execution similarly proceeds from each of these nodes to a sibling node if the answer to the question is "no," and to a child node if the answer is "yes."

In the case of test node 308, a "no" answer causes the execution of a sibling node, which in this example is an error node 310. An error node indicates that the answer can lead to no valid result. If an error node is reached during execution of a decision tree, an error indication will result. In the case of test node 306, a "yes" answer leads to the execution of test node 312, and a "yes" answer to that node leads to the execution of a result node 314. A result node indicates for example, that there has been a taxable event, or there has not. Execution of the nodes of the decision tree 300 proceeds through test nodes until reaching either a result node or an error node.

Figure 4:
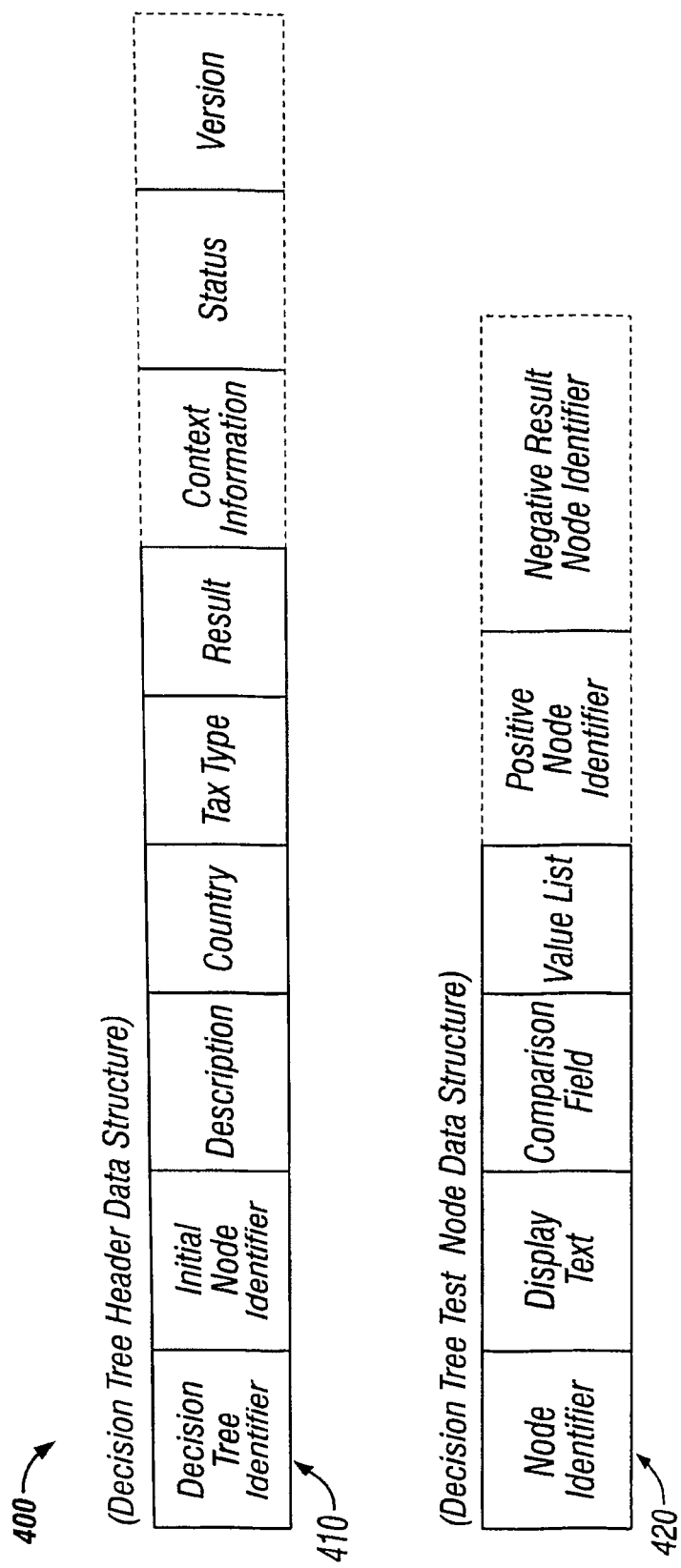
FIG. 4 is a figure illustrating a data structure for header information and a test node for an executable decision tree, which may be used in a system such as the system shown in FIG. 1.

FIG. 4 shows an example data structure 400 for a decision tree's header information 410 and a test node 420. In this example, the header information data structure 410 includes a decision tree identifier, for example, a key to the decision tree, which uniquely identifies the tree from other decision trees. The header data structure 410 in this example also includes an initial node identifier, which points to the first test node that is executed (for example, as is shown in FIG. 3). In some implementations, an initial node identifier is not needed, for example, if the decision trees are implemented in XML.

The header information data structure 410 also includes a textual description of the decision tree, for example, "Tax Determination for Germany/VAT." Also, the header information data structure 410 includes a country field (or the taxing authority), a tax type field (for example, VAT, sales, use, etc.), and a result field which indicates the possible results that may occur upon execution of the decision tree (for example, whether the tax is due, not due, suspended, deferred, etc.). In addition, the header data structure 410 may include context information which will be described later, status information such as whether the decision tree is active or in development, and version information, which may indicate, for example, the version number of the tree and perhaps the date the version was created.

The test node data structure 420 includes a node identifier, so that other nodes may point to the node for execution, which again, may not be needed depending on the implementation. Next, a display text field contains a textual description of the question for the node. This description may be displayed, for example, to a designer of the decision tree, as will be shown later. A comparison field specifies a field in the previously discussed input document (or alternatively a field in a calling system) where information needed to answer the question of the node is located so that it may be retrieved. A value list field identifies the values that the comparison field must equal for a positive result. In other words, a value in the comparison field is compared to one or more values in the value list field. A positive node identifier and a negative node identifier each identify the node to be executed if the answer to the node is, respectively, positive ("yes") or negative ("no"). Positive and negative node identifiers are not needed in all implementations; for example, they are not needed in an XML implementation.

A decision tree interpreter (included in the tax determination module 30 shown in FIG. 1, for example) evaluates the input document in the test nodes. The basis for comparison is a field catalog (which is described in detail in connection with FIG. 11) which contains a list of allowed fields to be used in the decision tree. When designing the tree, any of the fields from the field catalog may be used to define tests (questions). The input document contains all of the fields included in the field catalog. It is the duty of the calling application 20 (FIG. 1) to provide all of these fields defined in the field catalog, and map them accordingly in the case where the data model of the calling application 20 is different.

The decision tree interpreter, in one implementation, has two parts: a generic part for the processing of the nodes (for example, if a test node returns "true," go to the sibling node, else to the child node, etc.), and an implementation-specific part which provides a link between the input document and the decision tree interpreter. For example, if one test node contains the question "is the product a service?", then technically a parameter describing the product property of being a service is compared to the reference parameter in the test node. The implementation-specific part has a method for each parameter of the field catalog, and returns parameters to the decision tree interpreter for comparison. However, there are some parameters which are not uniquely defined (that is, the information exists as one single parameter in the input document), but rather may be a list of parameters. For example, the input document contains a list of all "business partners" involved in the transaction (that is, all of the parties to the transaction), and typically there will be two such business partners involved in the transaction.

If a test node needs to evaluate a business partner property (for example, the nationality of the business partner), then a "Context" parameter may be needed to define which of the business partners for which the parameter is required (for example, that of the supplier or that of the recipient). In this example, the context parameter for the test parameter "Nationality" may be, for example, the partner role "Recipient." It is possible to have multiple context dependencies as well. In many cases, parameters depend on the country and the tax type, for example, the taxability of the product. For example, one product may be classified as "Fully Liable to US Sales Tax," "Not Liable to US Service Tax," "Fully Liable to Mexican VAT," and "Partly Liable to Mexican Luxury Tax." The input document would contain a list of all product taxability information with country and tax type as key fields. By specifying the context parameters country and tax type, the decision tree interpreter knows which parameter of the list in the input document to use for the comparison.

In one implementation, the tax determination decision trees are implemented as XML documents, and may be processed by an XML processor. An example of a tax determination XML document is shown in FIGS. 5-9. The XML document depicted in FIGS. 5-9 may be implemented by a single XML document that comprises the decision, or may alternatively may be implemented by several XML documents that collectively comprise the decision tree.

Figure 5:
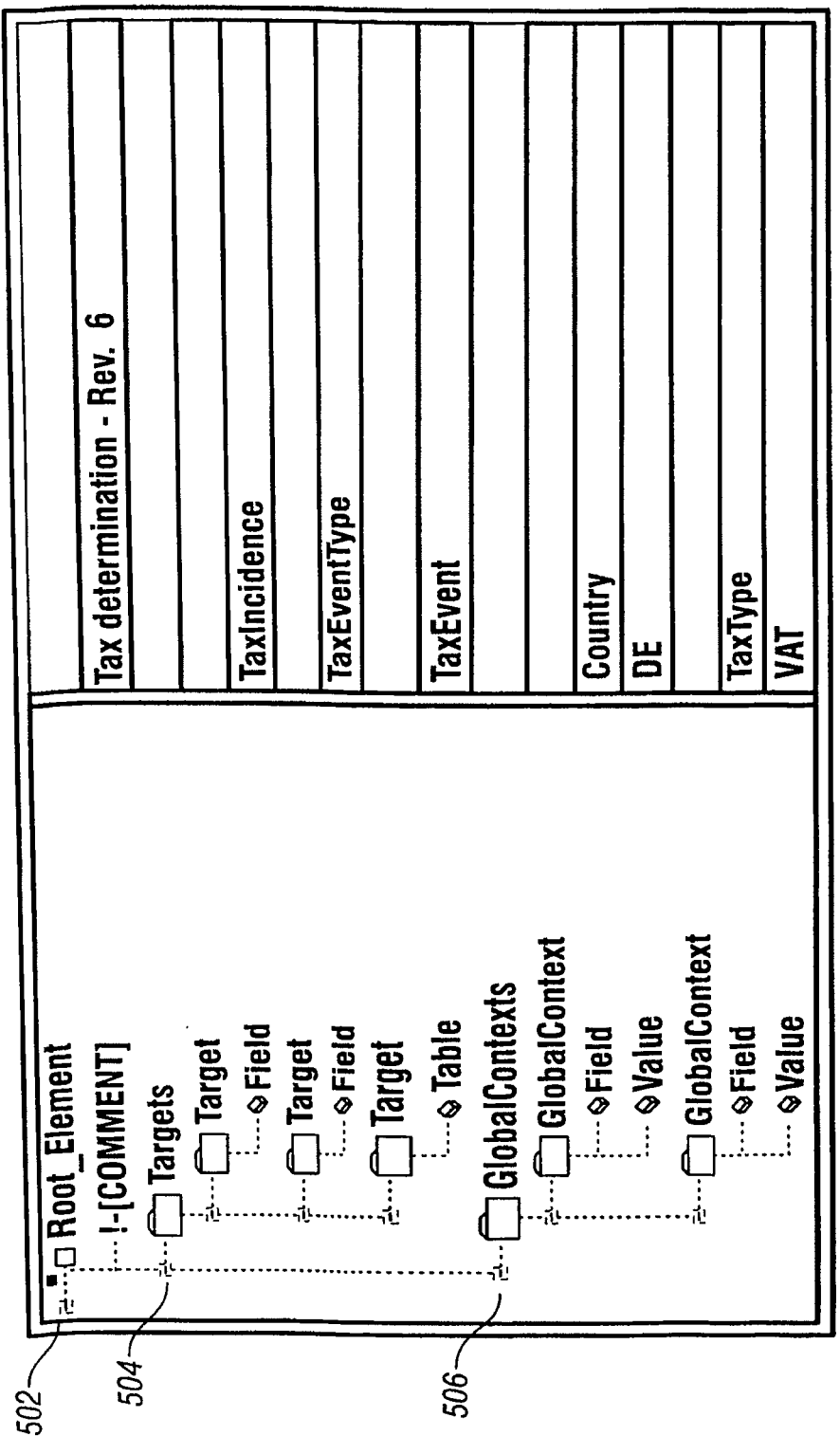
FIGS. 5-9 are figures showing the structure of XML documents making up an embodiment of a decision tree, which may be used in a system such as the system shown in FIG. 1.

Referring first to FIG. 5, the XML tax determination document contains <Targets> tags and <GlobalContexts> tags. The first element 504 after the root element 502 defines the "Targets" of the tax determination, that is, the field names of the desired results of the determination. In this example, the fields "Taxincidence," "TaxEventType" and "Tax Event" are the "Targets" that should result from the tax determination. It is also possible to define additional fields, for example, a fiscal code or some textual information. The desired fields are described in <Target> child-elements having the attribute "Field," or if a result may yield more than one possible value, a child-element having the attribute "Table." In this example, there may be several "Tax Events" to which a single "Tax Incidence" belongs, and hence the "Tax Events" result is expected in table form.

The "Tax Incidence" result is a description of the tax situation pertaining to one specific tax type. For example, the result may be that a certain tax is due, or not due. The "Tax Event" result is an ensemble of "Tax Incidences" for all possible tax types. The "Tax Event Type" result is a legally defined distinct type of tax levied under a certain "Tax Event" (for example, VAT, sales tax, mineral oil tax, withholding tax, etc.). The "Tax Event" result characterizes a business transaction from a taxation point of view (for example, domestic sales tax, zero-rated export, etc.), and defines which "Tax Event Types" are due and how they are calculated (which determines the tax procedure, as referred to in step 230 of FIG. 2). The "Tax Event" result may also be used for tax reporting, and is a summary of its underlying "Tax Incidences."

The next element 506 of the XML document defines "Global Contexts" that are constant for the whole tree. In this example, the fields "Country" and "TaxType" are the "GlobalContexts" that are used in the tree. In this example, the value for the "Country" field is "DE," or Germany, and the value of the "TaxType" field is "VAT." These global contexts are used in the execution of the decision tree where applicable, such as a key field for accessing dependent parameters. A "Context" is needed, as discussed previously, for extracting the proper information from the input document for comparison with the test parameters in the decision tree. A "Global Context" is a kind of default value relevant for the whole decision tree. In addition, each test node may require the definition of "local" context variables, as will be described later.

Figure 6:
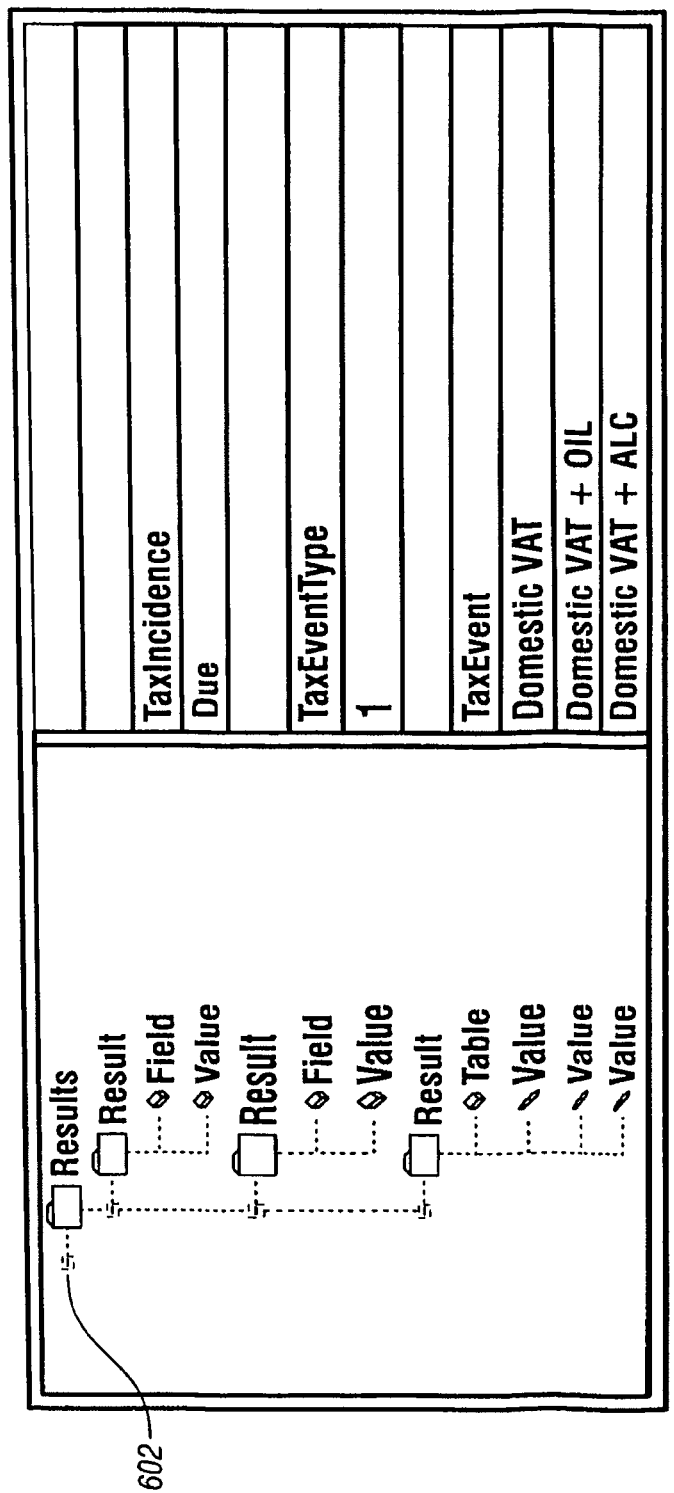

Referring now to FIG. 6, the counterpart to the <Targets> tag shown in FIG. 5, which describes the desired results, is the <Results> tag 602 shown in FIG. 6, which contains the actual found values resulting from the tax determination. The <Results> tag 602 contains one <Result> for each <Target> defined in the <Targets> tag 504 (FIG. 5). Each <Result> has either a "Field" attribute and an associated "Value" attribute, or a "Table" attribute and associated "Value" tags. For example, where the <Target> allowed for a table of results (as is the case with the "TaxEvent" target from FIG. 5), these results are stored in <Value> tags, rather than being stored as a single "Value" attribute. The <Results> tag 602 may only have <Result> tags as child elements, and no sibling elements, since the <Result> tags represent an endpoint of a decision tree.

As shown in FIG. 6, the value for the field "Taxincidence" is "due," and the value for the "TaxEventType" field is 1, which may correspond, for example, to a VAT. The three values for the table "TaxEvent" are "Domestic VAT," "Domestic VAT+OIL," and "Domestic VAT+ALC." In this example, "OIL" may be a German mineral oil tax, and "ALC" may be a German alcohol tax (both taxes are excise duties).

Figure 7:
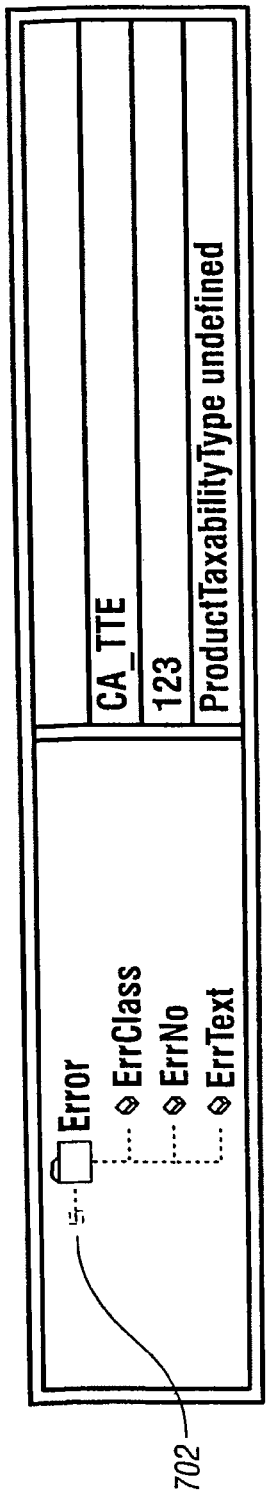

If the tax determination leads to a non-valid result, an <Error> tag 702, shown in FIG. 7, may be used instead of a <Results> tag as an endpoint of the decision tree, as shown previously in FIG. 3. Referring again to FIG. 7, the <Error> tag 702 has the attributes "ErrClass," "ErrNo," and "ErrText," which provide, respectively, the class of the error, the number for the error, and a textual description of the error.

Figure 8:
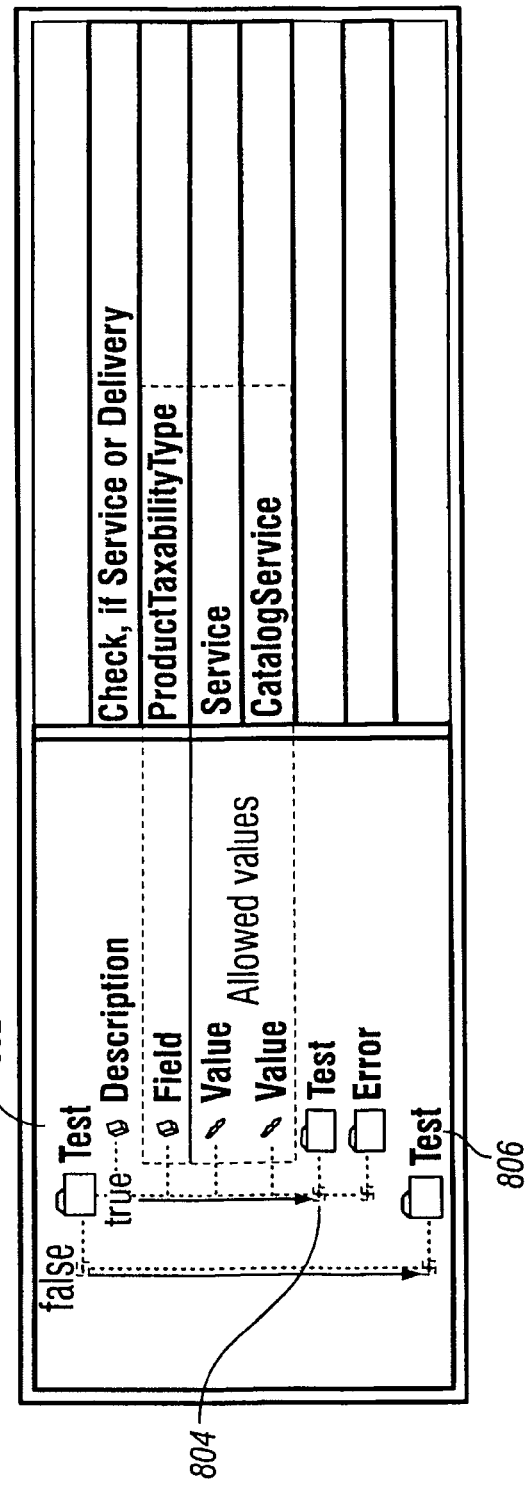
Figure 9:
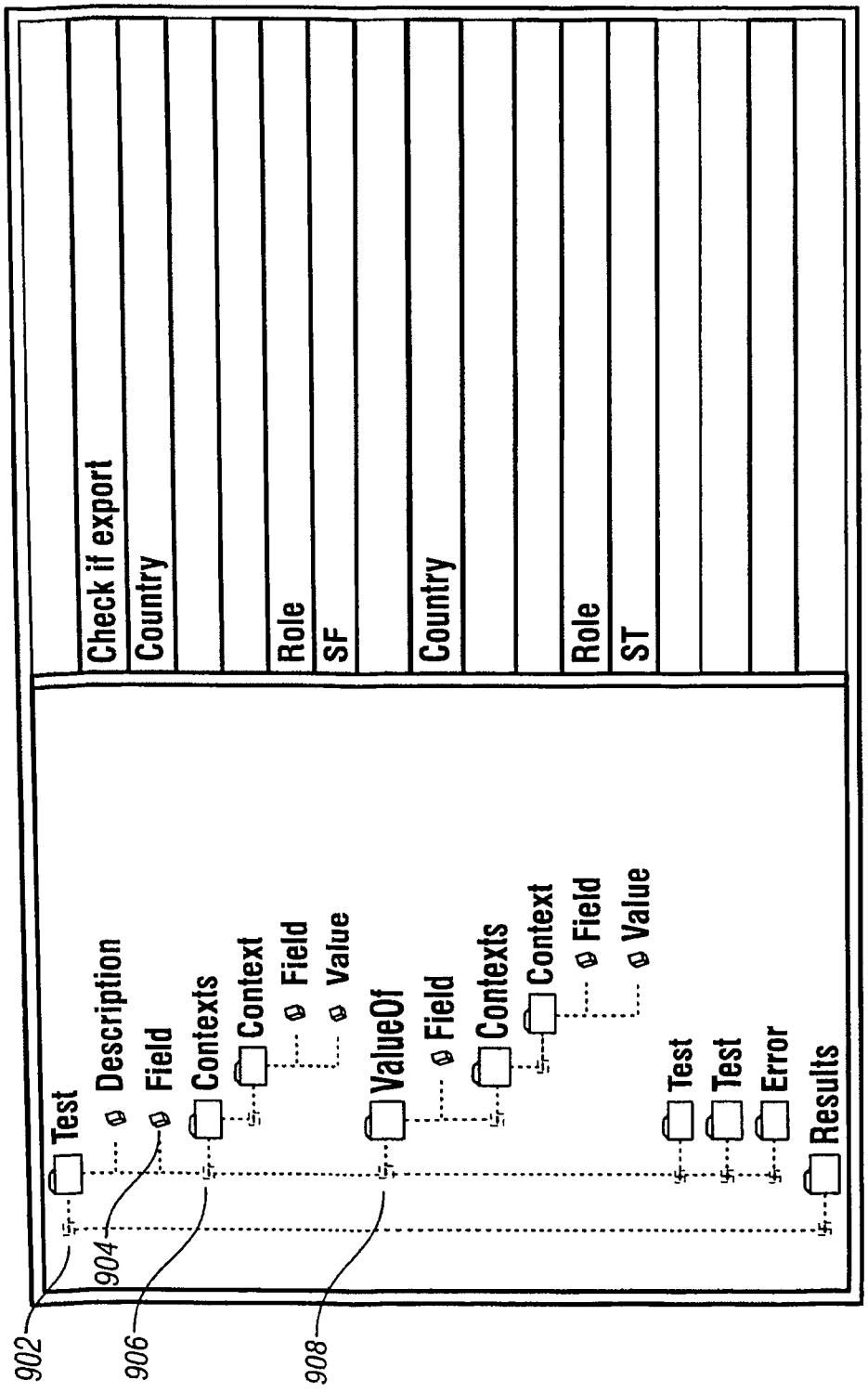

The actual tax determination is done by sequential decisions that are represented by <Test> tags, examples of which are shown in FIGS. 8 and 9. Each <Test> tag allows for the comparison of a specified parameter (identified by the "Field" attribute) against a list of allowed values (identified by the "Value" attributes). These allowed values may be defined in a fixed way (for example, when checking against customized values), or the allowed values might be determined dynamically (that is, comparing with another parameter).

The outcome of the comparison determines the next node that is processed. In the case of a positive result ("true," or in other words, the specified parameter equals one of the listed allowed values), the next child element of the <Test> element is processed. For example, for <Test> element 802 shown in FIG. 8, if a positive result ("true") is obtained, then the child element of <Test> element 802 is processed, which is <Test> element 804. In the case of a negative result ("false"), the next sibling element of the <Test> element 802 is processed, which is <Test> element 806.

Each <Test> element contains the attribute "Description," which may serve as documentation for the person developing the decision tree, or may be used for tracing. In the FIG. 8 example, the "Description" attribute for <Test> element 802 is "Check, if Service or Delivery," which is a textual description of the test that element 802 conducts. The "Field" attribute for <Test> element 802 is "ProductTaxabilityType." It is the value for this attribute for a transaction that is tested against the allowed values specified in the "Value" tags for <Test> element 802. The allowed values specified by the "Value" tags for <Test> element 802 are "Service" and "Catalog." As such, if, during execution of the decision tree, the "ProductTaxabilityType" for the transaction equals either "Service" or "CatalogService," then a positive result would be made for the <Test> element 802 and execution would proceed to <Test> element 804.

If a parameter being tested is not a unique among all attributes for a given transaction, but may occur multiple times, the usage of <Contexts> tags allows for the differentiation of which parameter is to be tested. This is illustrated in FIG. 9, which shows that for a <Test> element 902 has a "Field" attribute 904 of "Country." In this example, the attribute "Country" is not unique, and so the attribute is further defined by "Contexts" tag 906, which defines that that the specific "Country" attribute to be tested is the "Country" attribute with a context of "Role=SF." In other words, the country that is tested is the country of the entity, or "Business Partner," that is serving in the role of "ship from." In additions allowed values may also be dynamically determined. Instead of using a fixed <Value> tag, a <ValueOf> tag may be used to derive a comparison value. Again, a <Contexts> tag can be used to further specify the value. As illustrated in FIG. 9 where the <Test> element 902 has a <ValueOf> tag 908, the allowed value is the "Country" of the Business Partner having a "ship to" role.

Figure 10:
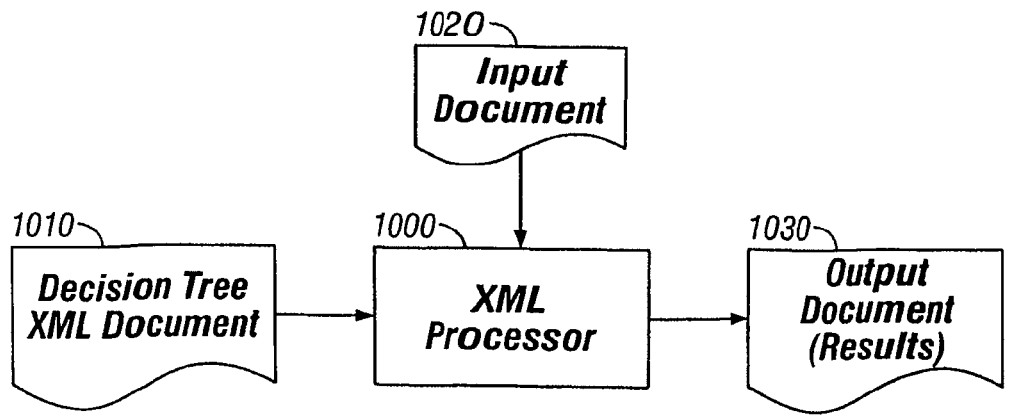
FIG. 10 is a diagram illustrating the execution of an XML decision tree document, which may be used in a system such as the system shown in FIG. 1.

FIG. 10 is a diagram showing the processing of a decision tree XML document during run-time. Referring also to FIG. 1, the tax determination module 30 may include XML processing capability to process XML documents as shown in FIG. 10. As discussed previously, the tax determination module 30 identifies a decision tree within the repository 40 for processing, and also may initiate the XML processing capability. Referring now to FIG. 10, an XML processor 1000 processes a decision tree XML document 1010. In so doing, the XML processor 1000 will use information that was compiled into an input document 1020, as discussed previously. The XML processor 1000 generates an output document 1030 with results of tax determination made using the decision tree document 1010 and the information from the input document 1020. The input document 1020 and the output document 1030 may also be in an XML format, or they may not be.

Figure 11:
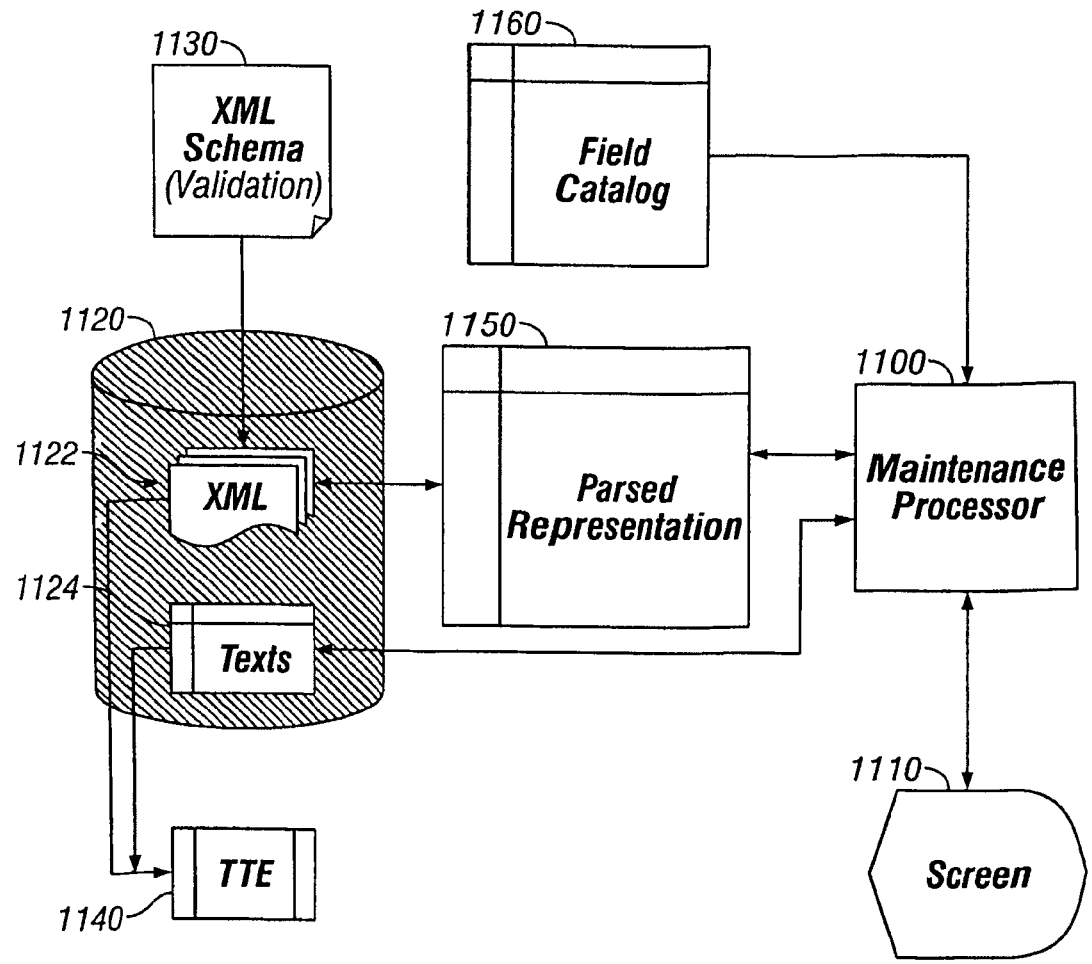
FIG. 11 is a block diagram of a system for creating a revising XML decision tree documents, the figure also illustrating data flows that occur during such processes.

Turning now to the creation and revision of decision trees, FIG. 11 shows an example system and process flows for performing this function. In the example shown in FIG. 11, the decision trees are implemented in XML. A maintenance processor 1100 controls the process of creating and revising decision trees, and may reside, for example, in a workstation that a developer uses. A video display screen 1110 connected to the maintenance processor 1110 provides the developer with a graphical view of a decision tree being created or revised.

In the FIG. 11 implementation, decision trees 1122 and associated texts 1124 are stored in memory 1120. Also, the decision trees 1122, in this example, are XML documents, as described previously. As such, a global XML schema 1130 is available for basic XML document validation. Each separate XML document (three of which are shown in FIG. 11) may be a different decision tree; alternatively, more than one XML document may make up a single decision tree. The memory 1120 shown in FIG. 11 may be, for example, the repository 40 shown in FIG. 1. Alternatively, the memory 1120 may be memory residing in a design computing environment, in which case the decision trees 1122 and associated text 1124 may be uploaded to a transaction tax engine (TTE) 1140, as shown by the arrows in FIG. 11. This upload may be made, for example, to the TTE 10 shown in FIG. 1, and specifically to the repository 40 of that TTE 10.

The XML documents 1122 are read and parsed by an XML parser (not shown in FIG. 11). This provides a parsed document object model (DOM) representation 1150 of the XML decision tree documents 1122. Data to be shown on the maintenance processor screen 1110 is read from the DOM representation 1150, and conversely, the DOM representation 1150 of decision trees is updated based on a designer's input being made to the maintenance processor 1100.

A field catalog 1160, described previously, is provided that defines which fields are available for use in a decision tree (when defining node details). The fields that are available in the field catalog 1160 may depend on a "decision tree type" indicator. The "decision tree type" indicator specifies the use of the decision tree. In the examples thus far described, the use of the decision tree is to determine whether taxable events have occurred. Other types of decision trees may be, for example, any kind of determination which needs a high flexibility of configuration and which typically has a high number of variables on which the determination depends may be suitable. For example, the decision trees may be used for determining a "Fiscal Code" for Brazilian transactions. The Fiscal Code is an official code to classify business transactions, and the proper Fiscal Code is required to be printed on invoices. The determination of the Fiscal Code depends on many parameters, including for example, the type of merchandise, type of transaction, type of business partners, origin and usage of the materials, etc.). Other examples of how the decision trees could be used are for determining a delivering plant according to certain optimization rules (geographical, availability, customer preferences, etc.), and for determining a bank and payment method for settlement according to certain criteria (such as vendor location, contracts, cash flow optimization, etc.)

As such, the maintenance processor 1100 may support more than one type of decision tree. Where this is the case, the "decision tree type" indicator may be used to determine a validation schema for the XML representation of a designed decision tree, because the validation schema may be different depending on the decision tree type. The "decision tree type" indicator may also determine the contents of the field catalog 1160 that are available for use in a decision tree being designed or revised.

Figure 12:
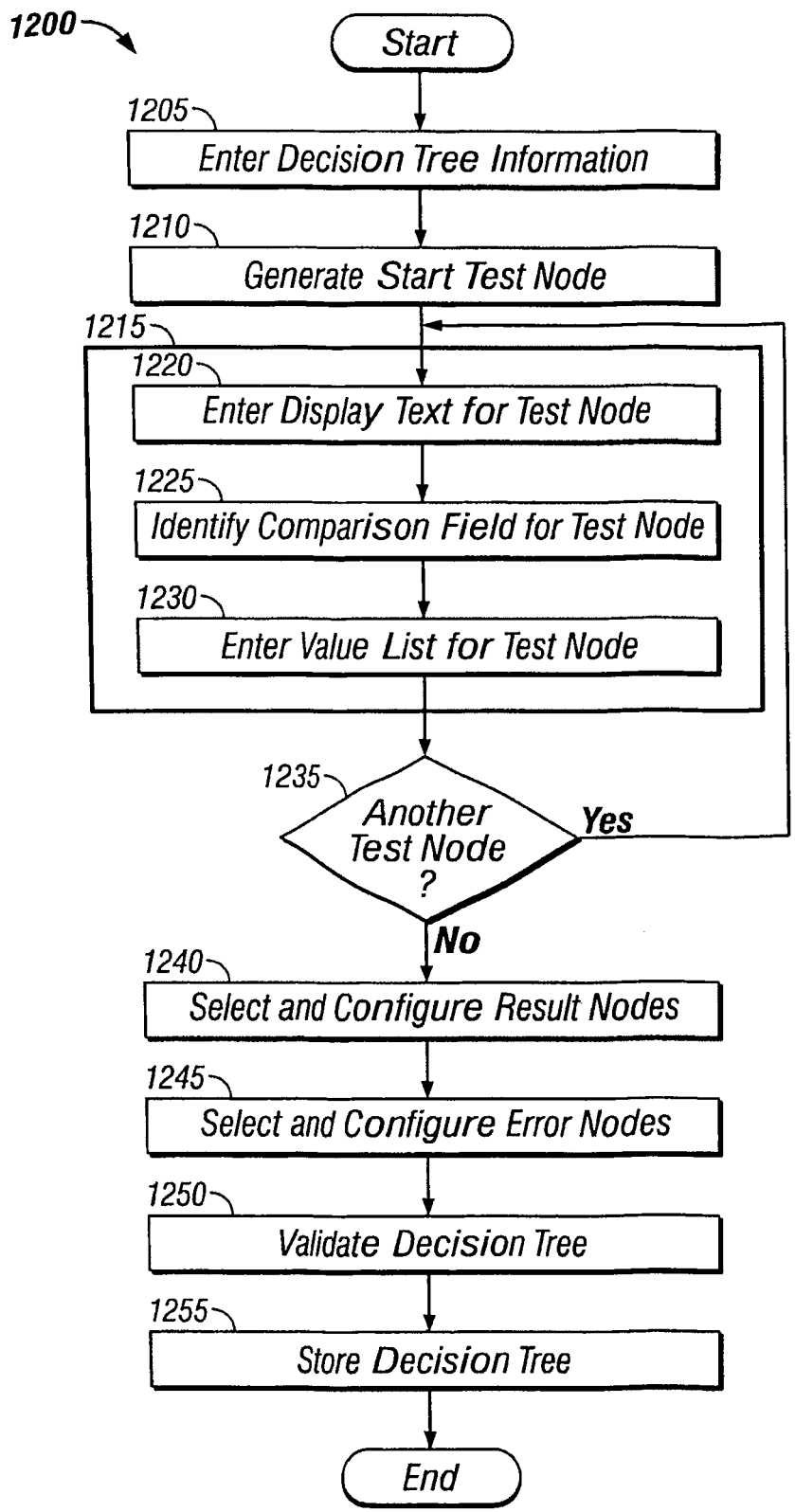
FIG. 12 is a flow chart of a method for creating decision trees, which may be used in a system such as the system shown in FIG. 11.

FIG. 12 shows an example process 1200 that may be executed by a maintenance processor (such as the processor 1100 shown in FIG. 11) to develop a decision tree. The process 1200 begins, at step 1205, where the processor allows a user to enter decision tree information. This may include, for example, header information such as that shown in FIG. 4. When the decision tree information is entered, a starting node is generated and displayed on the developer's screen (step 1210). This node will typically be a test node for the decision tree, and specifically will be the first test node of the decision tree that is executed at run time. For that node, the process 1200 proceeds to a test node configuration process 1215, where the processor receives user input of display text for the node (step 1220), such as text describing the question that the node is answering. As part of the node configuration step 1215, the processor also receives an identification of the node's comparison field (step 1225) and the node's value list (step 1230).

After the starting test node has been configured, additional test nodes may be selected and similarly configured by test node configuration process 1215. Step 1235 determines if there is another test node in the decision tree, and if so, the process 1215 may be performed for another node as indicated by the flow chart. As discussed previously, the structure of test nodes is such that each test node has an associated child node and sibling node. Therefore, the user indication that there is another test node may be made by a user's selection that a sibling or child node is going to serve as a test node.

At step 1240, the result nodes of the decision tree may be selected and configured. Result nodes will be either a child node or a sibling node of a test node, or both. As such, receiving a user's indication that a particular child or sibling node is to serve as a result node may be the user action that selects a results node. At step 1240, the user is also prompted to receive information regarding the result (for example, tax is due, not due, suspended, deferred, etc.)

At step 1245, the error nodes of the decision tree may be selected and configured. As with the result nodes, the error nodes will be either a child node or a sibling node of a test node, or both. As such, receiving a user's indication that a particular child or sibling node is to serve as an error node may be the user action that selects the error node. At step 1240, the user is also prompted to receive information regarding the error that is indicated if the error node is reached during execution of the tree. After all of the test, result and error nodes have been configured, the decision tree is validated (step 1250) and stored in memory (step 1255).

Persons knowledgeable in the art will understand that the design process need not follow the steps shown in FIG. 12 in the order indicated. For example, some result nodes may be configured before all the test nodes are configured. In addition, decision trees stored in memory may be recalled from memory and revised if necessary, using a process similar to that shown in FIG. 12.

Figure 13:
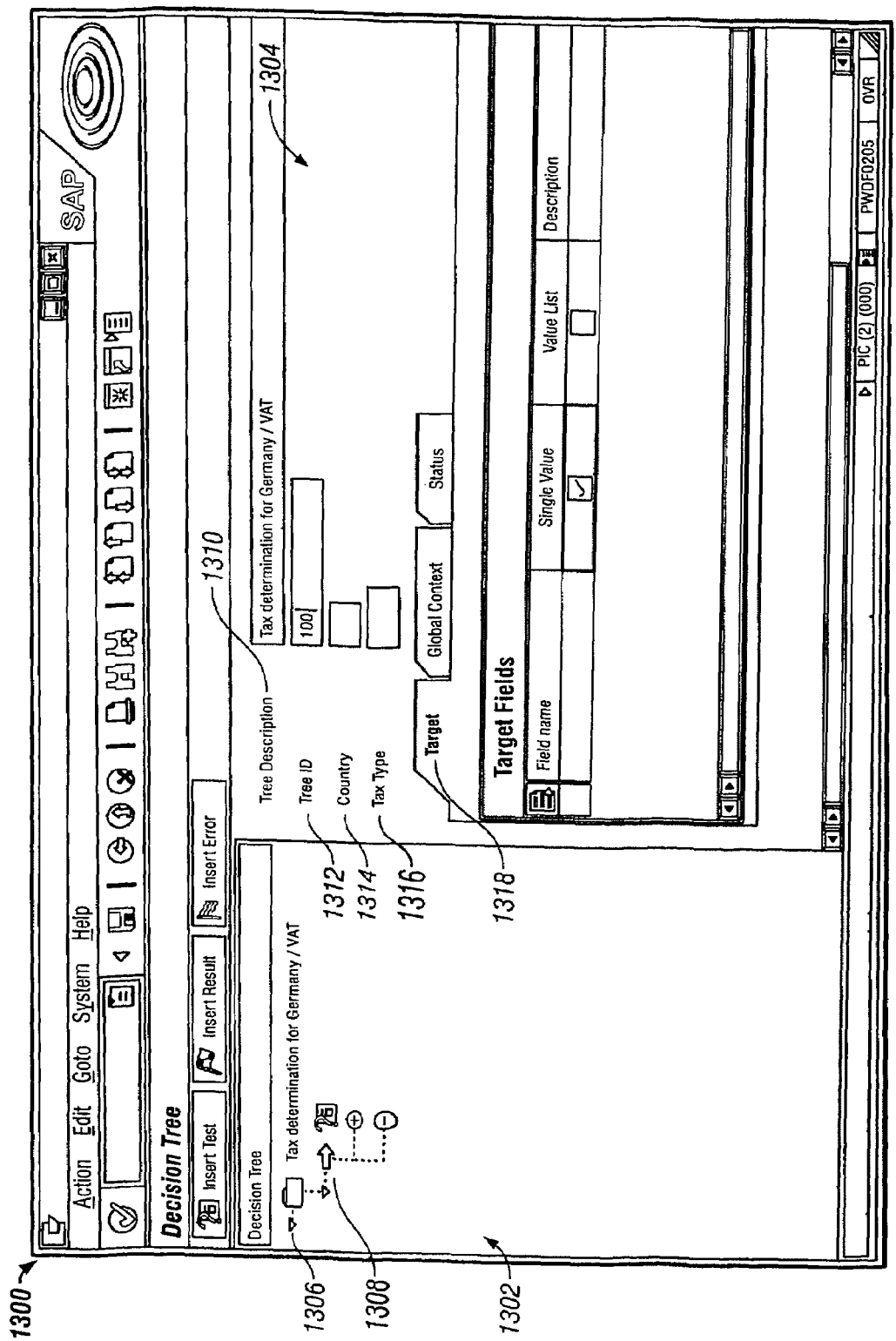
FIGS. 13-22 are screen snapshots of a user interface displayed when decision trees are created or revised, which may be displayed on a screen of a system such as the system shown in FIG. 11.

An example of a user interface that is displayed to a user who is developing or revising a decision tree will now be discussed in detail. FIG. 13 shows a screen snapshot 1300 of such a user interface, which presents a logical outline of the decision tree to the user. The user interface is capable of displaying the different decision tree nodes that represent a test, a result or an error condition, and displaying the interrelationships between the various nodes of the tree. In FIG. 13, a left-side portion 1302 of the user interface displays the decision tree outline using a hierarchy control. A right-side portion 1304 of the user interface includes sub-screens that display data associated with the nodes, and allow the user to enter and revise the data associated with the nodes.

When a designer uses the user interface to create a new decision tree, a header node 1306 and a beginning test node 1308 are created and displayed. The header node 1306 is used to maintain general information about the decision tree. By selecting (clicking) the header node 1306, which highlights the display of the header node 1306, input areas on the right-side portion 1304 are made available for entering or revising header information. For example, a "Tree Description" field 1310 has an associated input area for a textual description of the decision (for example, a "Tax determination for Germany/VAT" in this example. A "Tree ID" field 1312 has an associated input area for a number ("100") that uniquely identifies the decision tree from other decision trees. A "Country" field 1314 identifies the country, or taxing authority, for the decision tree, and a "Tax Type" field 1316 identifies the tax type for the decision tree (for example, VAT, sales tax, etc.). In this example, fields 1314 and 1316 are not yet filled in by a user, but would be filled in with "DE" for the "Country" field, and "VAT" for the "Tax Type."

The user may also input additional information about the header node using data entry areas associated with a "Target" tab 1318. This tab 1318 in the FIG. 13 example is located below the header field area described above, and is used to input information about the "Target" fields, which are the fields to be determined by the decision tree. A "Field Name" field is used to declare the result fields that are to be determined by the decision tree. The user can choose whether a result field will consist of a single value or a list of values by selecting either the "Single Value" button or the "Value List" button, respectively. The user may use the "Description" field to input a description of a corresponding "Field Name" field. For example, by entering different field names, the decision tree may be configured to determine whether a tax type, which is a legally defined distinct type of tax that is levied (e.g., value-added tax, sales tax, mineral oil tax, etc.) is implicated, whether a tax incidence, which describes the tax situation pertaining to a particular tax type, has occurred or whether a tax event, which characterizes a business transaction from a taxation point of view, has occurred.

Figure 14:
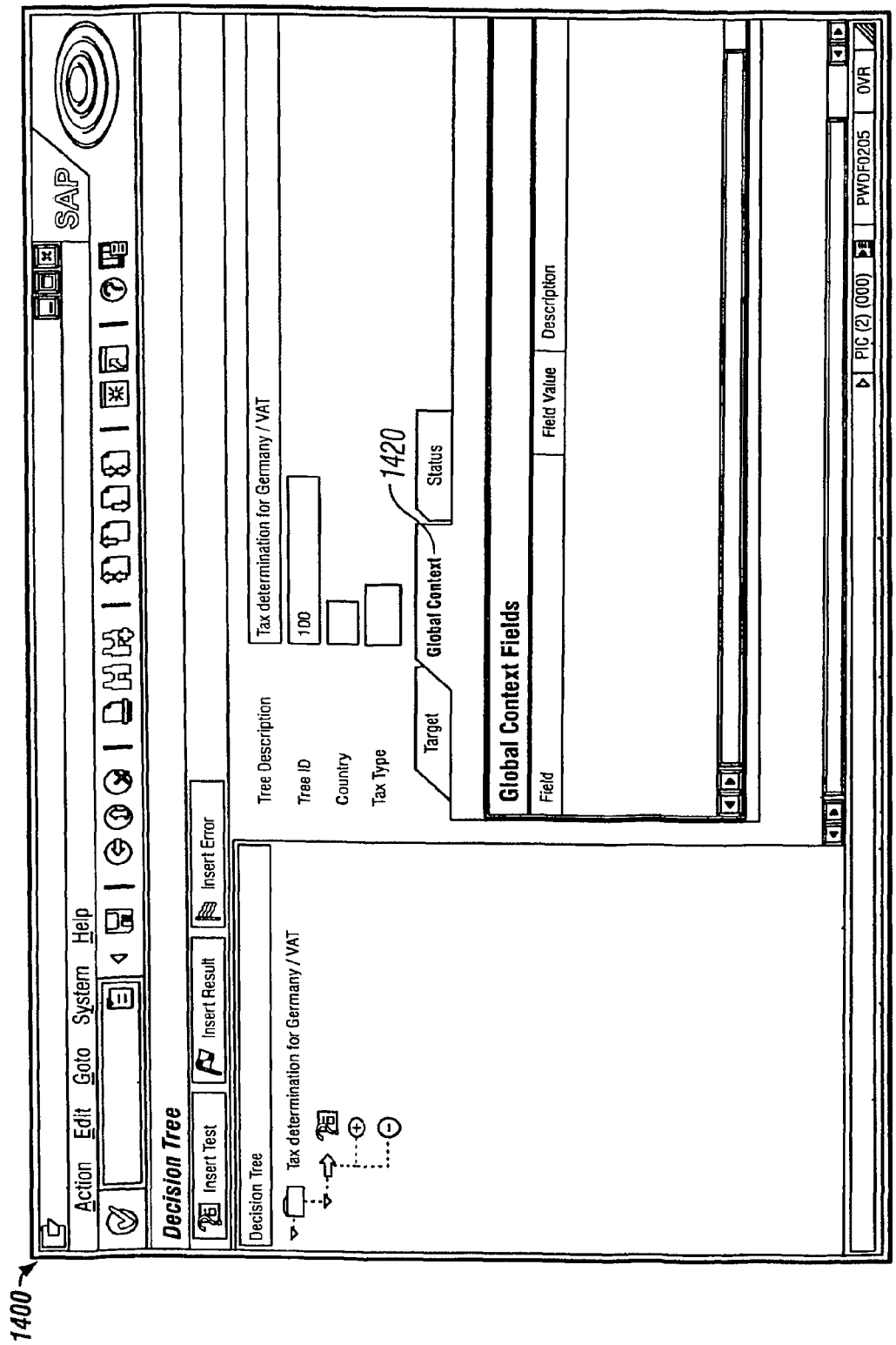

Referring to FIG. 14 and another screen snapshot 1400 of the user interface, a tab 1420 labeled "Global Context" has associated data entry areas for information about context fields that are valid for the entire decision tree. A "Field" field is used to indicate the name of the field that is valid for the entire decision tree, a "Field Value" field is used to input the value of the field that is valid for the entire decision tree, and a "Description" field is used to input information describing the "GlobalContext" field.

Figure 15:
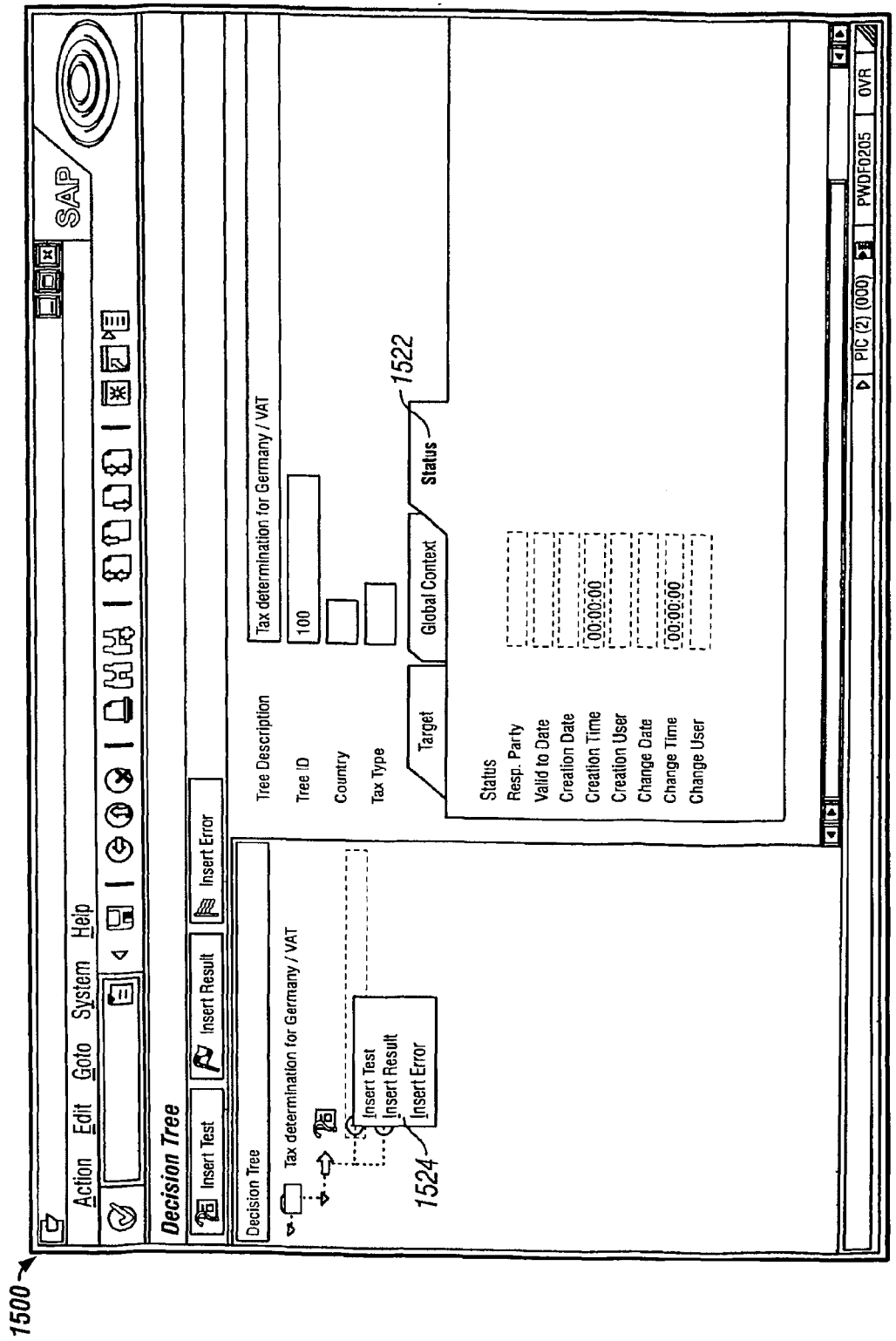

Referring to FIG. 15 and another screen snapshot 1500 shown there, a "Status" tab 1522 is used to view status information about the decision tree. The "Status" tab 1522 displays information such as the decision tree's creation date and time, an identification of the person who created the decision tree, a date that the decision tree was last changed, a time when the decision tree was last changed, and an identification of the user who last changed the decision tree. This information provides a history of the decision tree.

Once the configuration of the header node of the decision tree, by entering information into the "Target" and "Global Context" tabs is completed, a user may now configure the decision tree to make a tax determination by adding and modifying nodes. The tax expert may create a new node by right-clicking on a "yes" or "no" answer node of a logical test node. A context menu 1524 will appear and provide the user the option to insert a test node, insert a result node or insert an error node. By selecting one of these options, the user establishes the type of node that the node will be.

Figure 16:
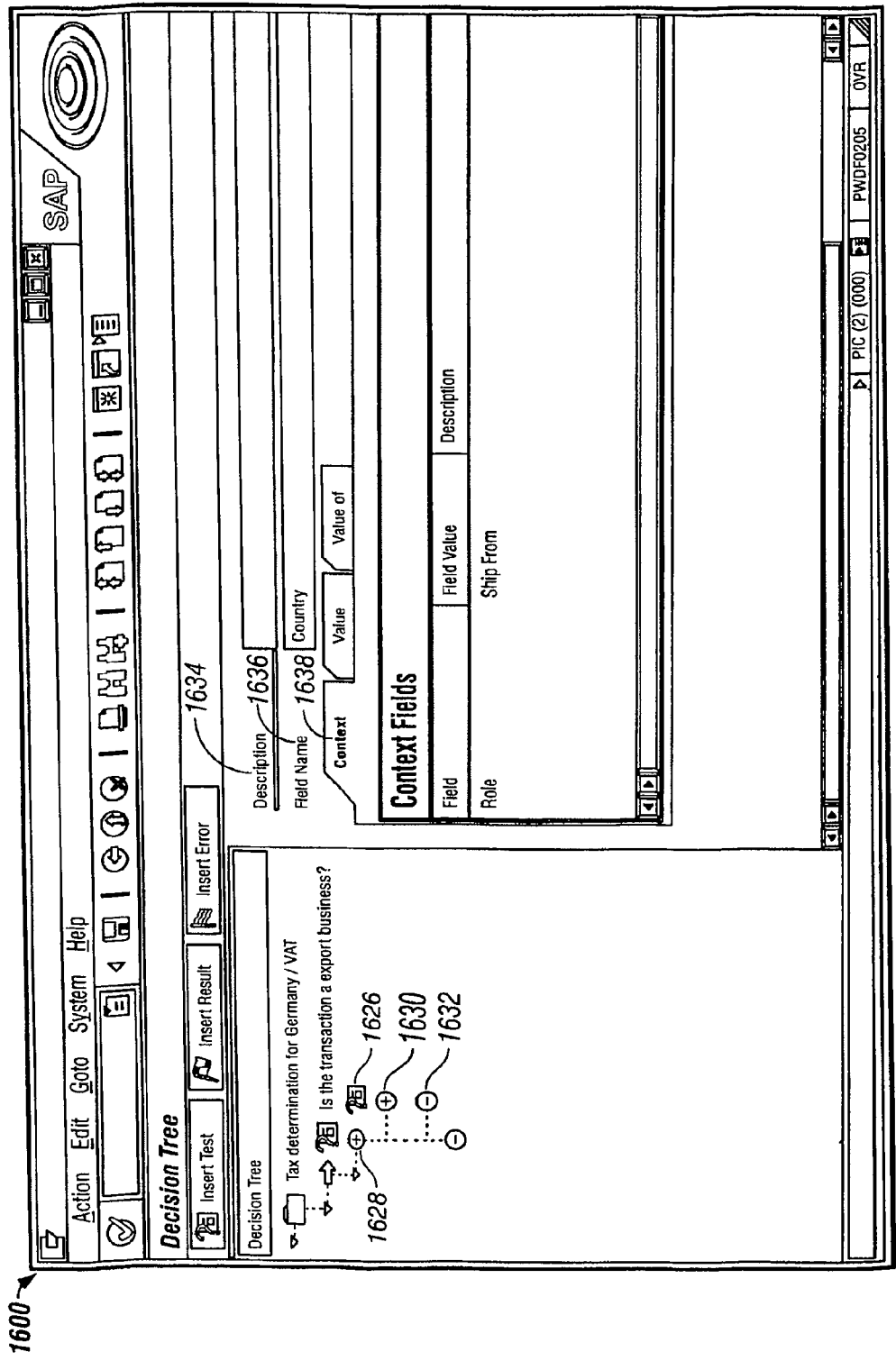

Referring to another screen snapshot 1600 shown in FIG. 16, when a user chooses to insert a test node, a new group of three nodes will be created. A logical test node is created and displayed to the right of the selected answer node. In the example shown in FIG. 16, a logical test node 1626 is created next to a yes node 1628. A "yes" node 1630 and a "no" node 1632 are created below the newly created logical test node 1626. When the new test node is created, the sub-screen on the right side of the user interface also changes to allow the tax expert to define the attributes of the new test node 1626. On the attribute sub-screen the user may input a description of the test in the "Description" field and the name of the field to be tested in the "Field Name." Below these fields are three sub-screen tabs. The user may use these tabs to define the test node. By selecting the "Context" tab 1638, a list of context options may be input by the user for the "Field Name" field 1636. The user may enter the name of the context option field, field values, and a description of the context option field. In the example, the field named "Country" is tested for the context option "Role" field whose value is "Ship From."

Figure 17:
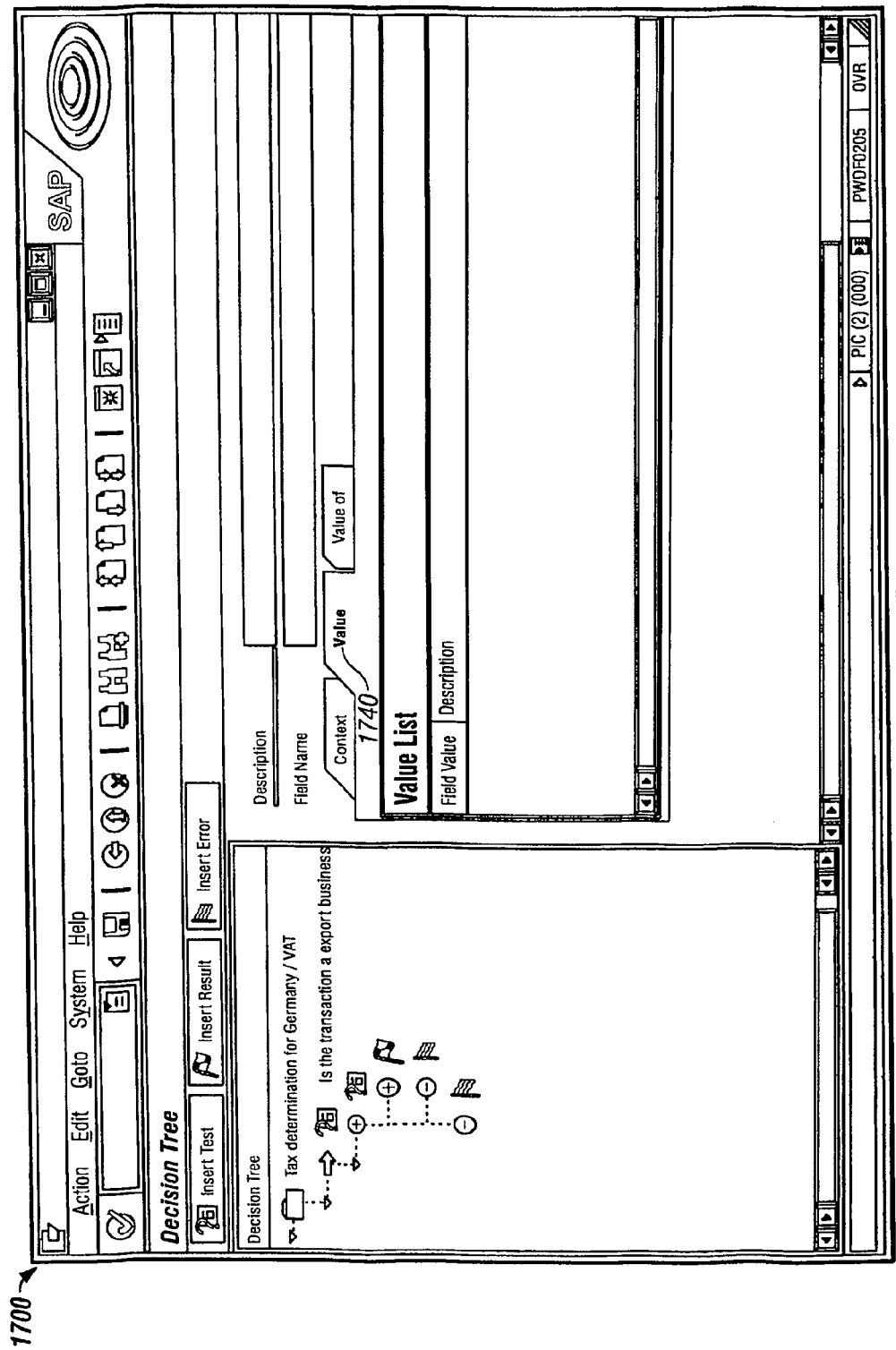
Figure 18:
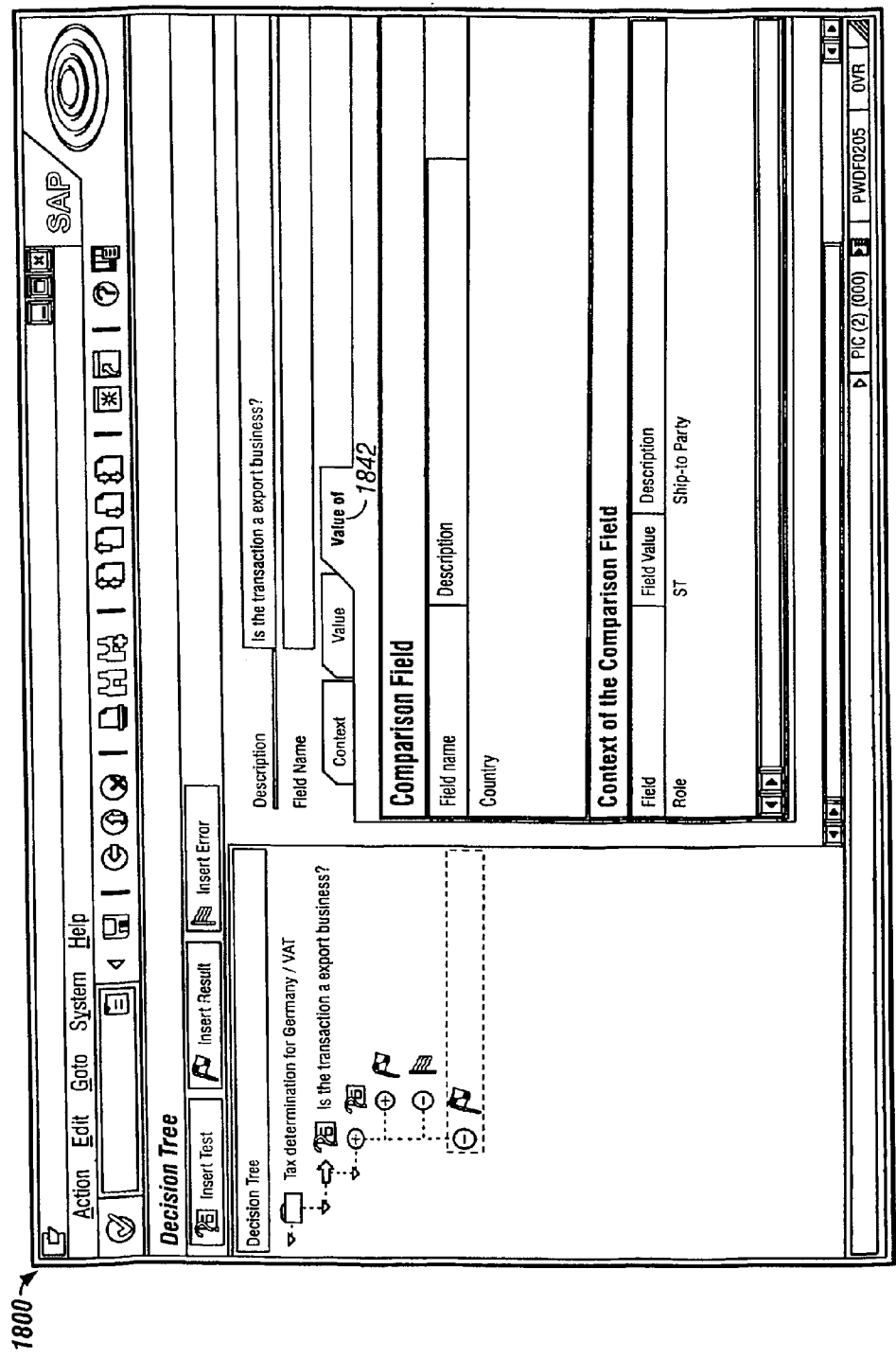

Referring to yet another screen snapshot 1700 shown in FIG. 17, it is shown that by selecting a "Value" tab 1740, a user may define one or more acceptable values for the question field using the "Field Value" and "Description" fields. Therefore, the decision tree will determine whether the value of the field to be tested equals the value of one of the allowed values among the list of acceptable values provided by the tax expert. Referring to FIG. 18 and screen snapshot 1800, it is shown that by selecting a "Value Of" tab 1842, a user may also configure the decision tree to compare two dynamic field values. In the example, the field named "Country" when the field "Role" has a value "Ship To" is compared to the field named "Country" when the field "Role" has a value "Ship From."

Figure 19:
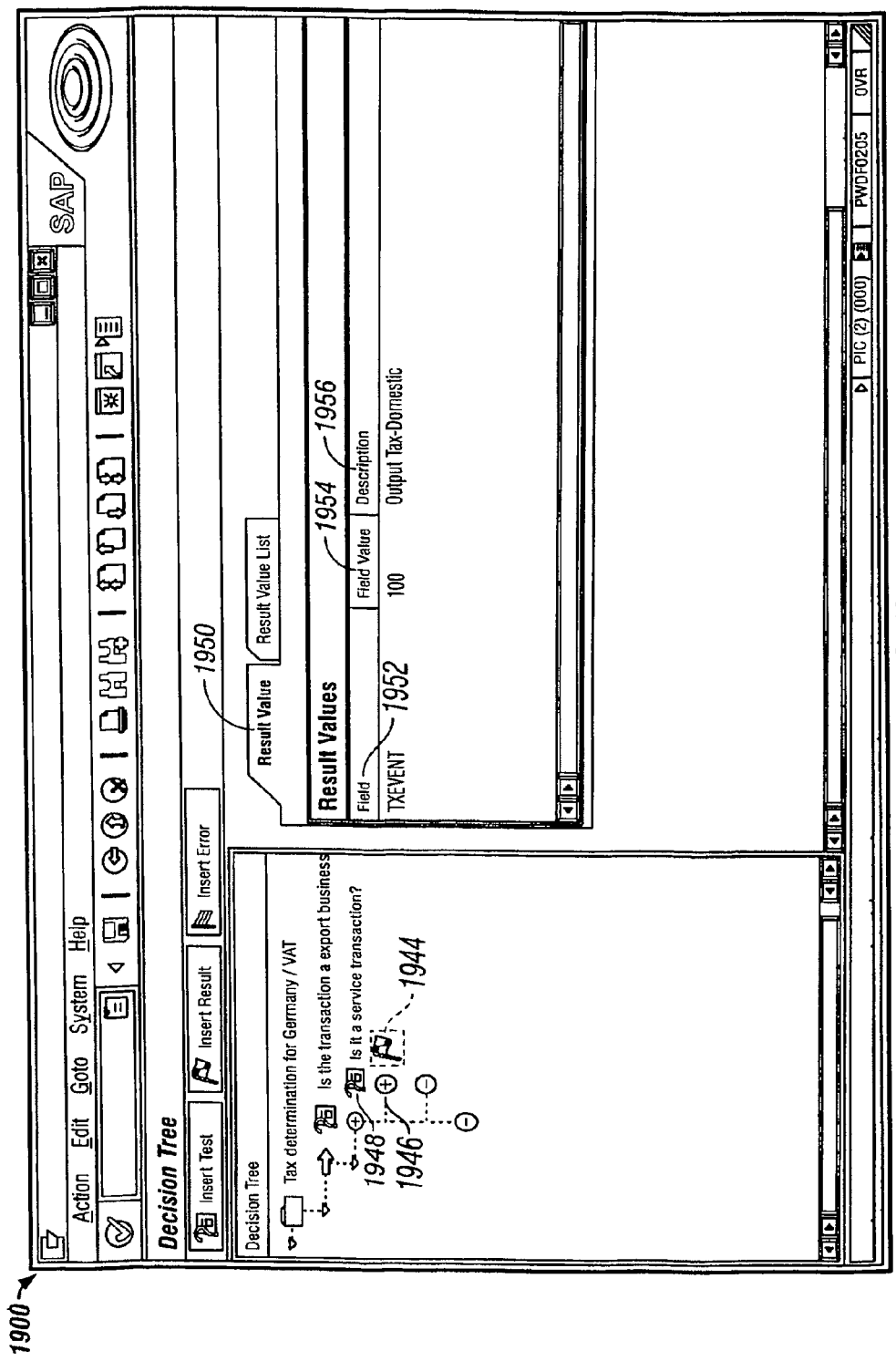
Figure 20:
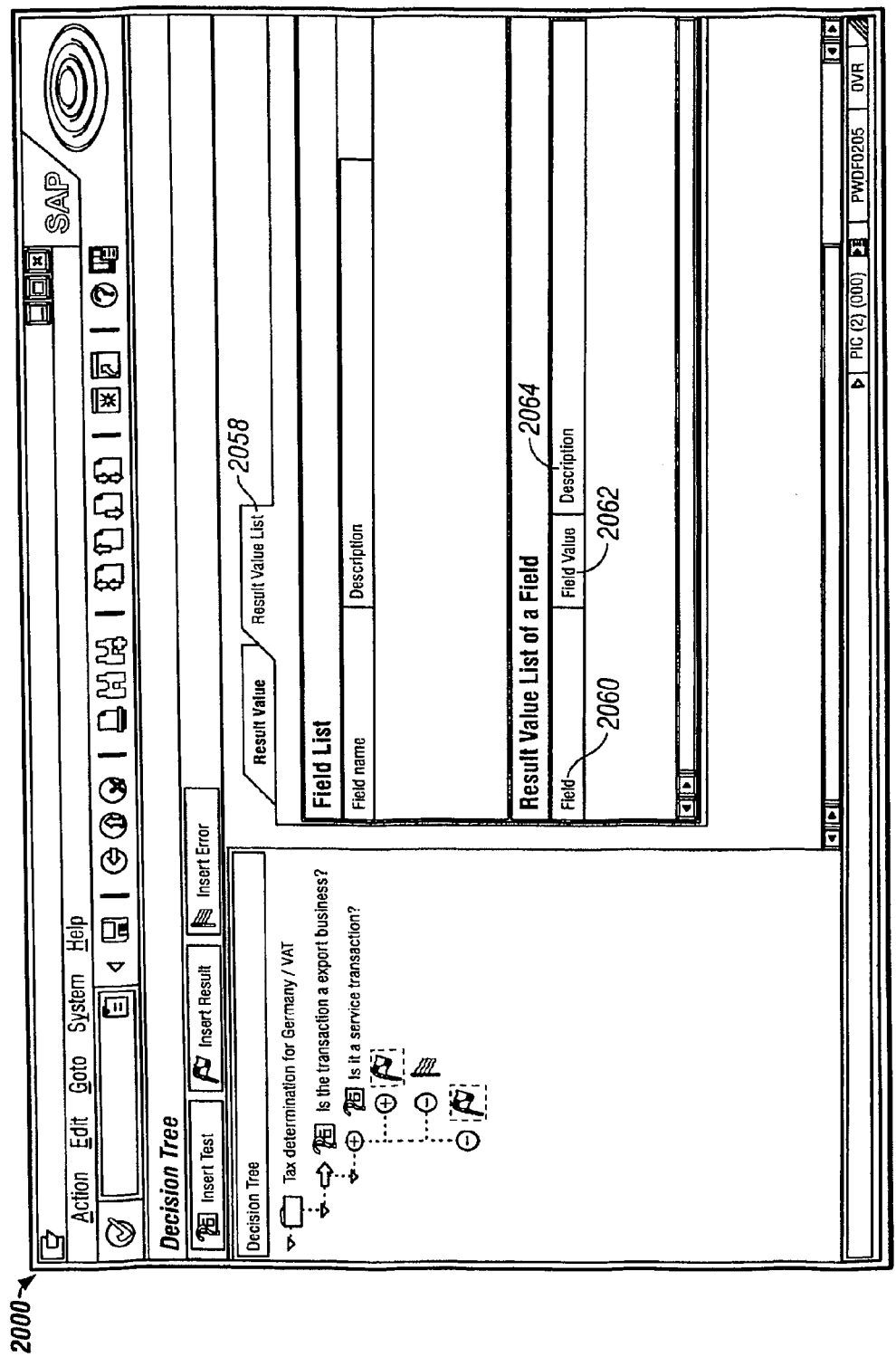

Referring to FIG. 19 and screen snapshot 1900 shown there, a user may insert a result node next to a yes or no answer node by right-clicking on the yes or no answer node and selecting Insert Result from the context menu that appears. The result nodes of a decision tree indicate that for the sequence of test questions and answers that led to the result node, no more tests need to be performed and the tax determination has found a valid result. In the example, a result node 1944 has been created next to the yes answer node 1946 of the test node "Is it a service transaction?" 1948. When the new result node 1944 is created, the sub-screen on the right side of the user interface also changes to allow the tax expert to define the attributes of the new result node. By selecting the "Result Value" tab 1950 in the attribute sub-screen, the tax expert can input a Result Values "Field" 1952, a value for the field 1954 and a description 1956 of the field. For example, the tax expert may configure this result node to indicate that the sequence of test questions and answer nodes that led to this result node resulted in the finding of a value "100" for the field "TXEVENT," which indicates that the business transaction for which data was provided to the decision tree results in a domestic output tax being due. Alternatively, referring to FIG. 20 and screen snapshot 2000, the tax expert may select the "Result Value List" tab 2060 in the attribute sub-screen, to input a Result Value field 2062, list of values for that field 2062, and a description 2064 of that field for those target fields (i.e., fields that must be determined by the decision tree) that were configured as a value list in the header node.

Figure 21:
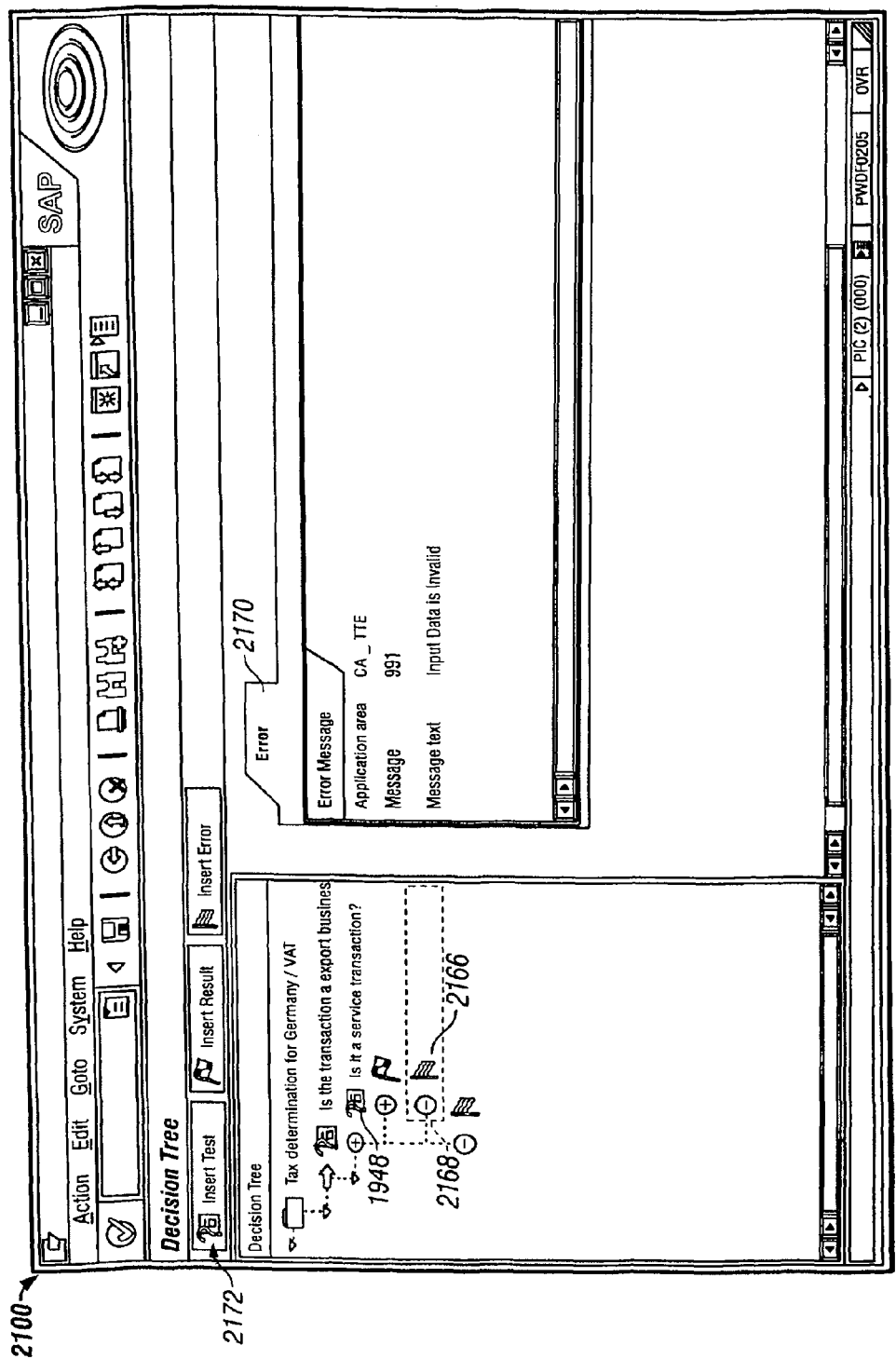

Referring to FIG. 21 and screen snapshot 2100 shown there, a tax expert may insert an error node next to a yes or no answer node by right-clicking on the yes or no answer node and selecting Insert Error from the context menu that appears. The error nodes of a decision tree indicate that for the sequence of test questions and answers that led to the error node, the decision tree cannot find a valid result during its tax determination and therefore returns an error message. In the example, a new error node 2166 has been created next to the no answer node 2168 of the text node "Is it a service transaction?" 1948. When the new error node 2166 is created, the sub-screen on the right side of the user interface also changes to allow the tax expert to define the attributes of the new error node. By selecting the "Error" tab 2170 in the attribute sub-screen, the tax expert can input information about the application area of the error message, the message identification number, and message text to describe the error for future use. Alternatively, the tax expert may use the Insert Test, Insert Result and Insert Error buttons located in a button-type menu 2172 of the user interface to create new nodes. Once a node of a decision tree has been created, a user can modify the information found in that node at any time by double-clicking the node to access the fields in the attribute sub-screens. Once information describing a decision tree (as mentioned above) is input using the user interface, the transaction tax configuration program module determines whether any information was received in the fields of the attribute sub-screens. If so, the transaction tax configuration program module updates the XML document, text table, and maintenance table with this new information.

The user interface may provide a tax expert with additional functions to modify a decision tree. The user interface may include buttons that allow a tax expert to delete an existing branch of the decision tree, cut or copy an existing branch of a decision tree and paste that branch in another area of the decision tree. An additional modification or maintenance function of the user interface includes a check command. The check command may be used to determine whether there are any open branches (e.g., branches that are not terminated with either a result node or an error node), whether each node is defined completely, and whether the XML document is valid. The user interface also may include a function that allows the status of every node to be displayed. The user interface may also provide automatic versioning of decision trees. When a decision tree is created it is automatically assigned version "1". When the decision tree is being modified it is given a maintenance version number. When the decision tree is ready for productive use, it is released. The released decision tree is also given a version number. When the released decision tree is modified, a new version is created automatically by copying the current version and incrementing the version counter by one. This modified decision tree must be released again for productive use.

Figure 22:
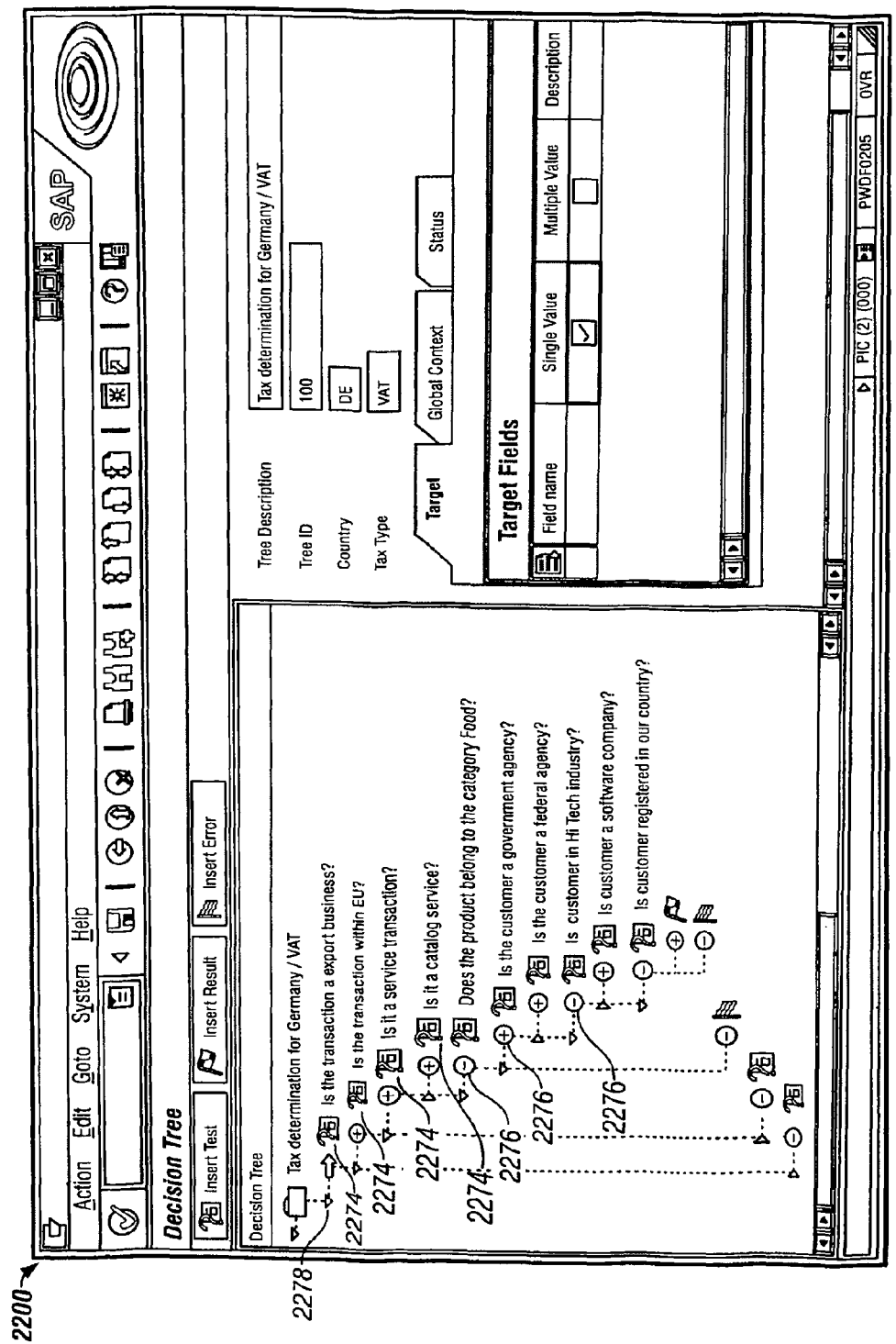

As shown in screen snapshot 2200 of FIG. 22, a graphical presentation of a sequence of logically related questions 2274 and the answers 2276 to these questions. A decision tree may improve a user's understanding of a complicated situation and help the user make more informed decisions. A tax expert may use the user interface to completely represent a complicated tax situation. Because the yes and no nodes always represent the yes and no answers, respectively, to the question located beside the test node directly above them, it is easy to determine the answers associated with each question by looking at the user interface. The tax expert can collapse the nodes he in not interested in and obtain a clear picture of the portion of the decision tree he is interested in by using the tree control 2278 associated with a node to expand or collapse that node.

The user interface also may allow a user to copy a previous version of a decision tree into a new or current maintenance version of a decision tree, copy an existing tree, save a current tree under a new name, display the current released version and maintenance version of the decision tree, navigate to a particular node of a decision tree using a search capability (e.g., search for a result node with a particular result value), display the complete decision tree in a printable format, upload an XML document from a local file into a new decision tree, view the XML source code of an XML document and delete a decision tree. When a decision tree is deleted the data is not removed but its status is changed to deleted.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, comprising:
receiving first user input that:
i) creates a beginning test node for a computer-executable decision tree, the computer-executable decision tree being executable by a computing system for use in determining taxes for a particular commercial transaction,
ii) defines a comparison field for the beginning test node, wherein the comparison field for the beginning test node specifies a first particular field that is in either an input document or a calling computer system and that is to provide a first particular value arising from the particular commercial transaction, and
iii) defines a list of allowed values for the first particular value arising from the particular commercial transaction;
generating, in response to receiving the first user input, a first graphical user interface to present a first graphical view of the decision tree, the first graphical view of the decision tree including:
(a) the beginning test node,
(b) a yes answer node of the beginning test node, and
(c) a no answer node of the beginning test node;
receiving second user input that:
i) creates a second test node for the decision tree by selecting the yes answer node of the beginning test node, which second test node is dependent upon the beginning test node,
ii) defines a second comparison field for the second test node, wherein the second comparison field for the second test node specifies a second particular field that is in the input document or the calling computer system and that is to provide a second particular value arising from the tax determination process, and
iii) defines a list of allowed values for the second particular value arising from the particular commercial transaction;
generating, in response to receiving the second user input, a second graphical user interface to present a second graphical view of the decision tree, the second graphical view including:
(a) the beginning test node,
(b) the yes answer node of the beginning test node,
(c) the no answer node of the beginning test node,
(d) the second test node that is dependent on the beginning test node,
(e) a yes answer node of the second test node, and
(f) a no answer node of the second test node;
receiving third user input that creates a third test node for the decision tree by selecting the no answer node of the beginning test node, which third test node is dependent upon the beginning test node; and
executing, by the computing system, the decision tree in order to determine taxes for the particular commercial transaction, wherein the computing system is configured to, during execution of the decision tree:
i) proceed from the beginning test node to the second test node as a result of a positive result in a comparison action between the first particular value and the list of allowed values for the first particular value, and
ii) proceed from the beginning test node to the third test node as a result of a negative result in the comparison action between the first particular value and the list of allowed values for the first particular value.

2. The computer-implemented method of claim 1, further comprising receiving additional user input that creates one or more additional nodes for the decision tree, the additional user input selecting, for each of the one or more additional nodes, a yes answer node of a previously defined node upon which the additional node is dependent, or a no answer node of the previously defined node upon which the additional node is dependent.

3. The computer-implemented method of claim 2, further comprising updating the second graphical user interface, for each of the one or more additional nodes, so that the second graphical view includes a representation of each of the one or more additional nodes in relation to a representation of the previously defined node from which the additional node depends.

4. The computer-implemented method of claim 1, wherein the beginning test node is selectable to either display or hide the second test node.

5. The computer-implemented method of claim 1, wherein a definition for each of the beginning test node and the second test node includes test node display text for each respective test node, and the displayed representation of the test nodes includes each respective test node display text.

6. The computer-implemented method of claim 1, further comprising receiving user input that defines one or more result nodes that each indicate that there has either been a taxable event for the commercial transaction or there has not been a taxable event for the commercial transaction, wherein each of the defined result nodes is dependent on a selected previously defined node.

7. The computer-implemented method of claim 1, further comprising receiving user input that defines one or more error nodes that each indicate that the decision tree cannot find a valid result for a sequence of comparisons, wherein each of the defined error nodes is dependent on a selected previously defined node.

8. The computer-implemented method of claim 1, further comprising receiving user input that defines header information that identifies the decision tree so that the decision tree may be called for execution from among a plurality of decision trees that represent different combinations of transaction taxes for taxing authorities.

9. The computer-implemented method of claim 1, wherein the list of allowed values for the first particular value includes a single allowed value.

10. The computer-implemented method of claim 1, wherein the list of allowed values for the first particular value includes a range of allowed values.

11. The computer-implemented method of claim 1, wherein receiving the second user input that selects the yes answer node includes receiving user input that clicks on the yes answer node of the beginning test node.

12. A non-transitory computer storage medium including instructions that, when executed by a processor, cause a machine to perform operations, the operations comprising:
receiving first user input that:
i) creates a beginning test node for a computer-executable decision tree, the computer-executable decision tree being executable by a computing system for use in determining taxes for a particular commercial transaction,
ii) defines a comparison field for the beginning test node, wherein the comparison field for the beginning test node specifies a first particular field that is in either an input document or a calling computer system and that is to provide a first particular value arising from the particular commercial transaction, and iii) defines a list of allowed values for the first particular value arising from the particular commercial transaction;

generating, in response to receiving the first user input, a first graphical user interface to present a first graphical view of the decision tree, the first graphical view of the decision tree including:
  (a) the beginning test node,
  (b) a yes answer node of the beginning test node, and
  (c) a no answer node of the beginning test node;

receiving second user input that:
  i) creates a second test node for the decision tree by selecting the yes answer node of the beginning test node, which second test node is dependent upon the beginning test node,
  ii) defines a second comparison field for the second test node, wherein the second comparison field for the second test node specifies a second particular field that is in the input document or the calling computer system and that is to provide a second particular value arising from the tax determination process, and
  iii) defines a list of allowed values for the second particular value arising from the particular commercial transaction;

generating, in response to receiving the second user input, a second graphical user interface to present a second graphical view of the decision tree, the second graphical view including:
  (a) the beginning test node,
  (b) the yes answer node of the beginning test node,
  (c) the no answer node of the beginning test node,
  (d) the second test node that is dependent on the beginning test node,
  (e) a yes answer node of the second test node, and
  (f) a no answer node of the second test node;

receiving third user input that creates a third test node for the decision tree by selecting the no answer node of the beginning test node, which third test node is dependent upon the beginning test node; and executing, by the computing system, the decision tree in order to determine taxes for the particular commercial transaction, wherein the computing system is configured to, during execution of the decision tree:
  i) proceed from the beginning test node to the second test node as a result of a positive result in a comparison action between the first particular value and the list of allowed values for the first particular value, and
  ii) proceed from the beginning test node to the third test node as a result of a negative result in the comparison action between the first particular value and the list of allowed values for the first particular value.

13. The computer storage medium of claim 12, wherein the operations further comprise:
receiving additional user input that creates one or more additional nodes for the decision tree, the additional user input selecting, for each of the one or more additional nodes, a yes answer node of a previously defined node upon which the additional node is dependent, or a no answer node of the previously defined node upon which the additional node is dependent.

14. The computer storage medium of claim 12, wherein the operations further comprise:
updating the second graphical user interface, for each of the one or more additional nodes, so that the second graphical view includes a representation of each of the one or more additional nodes in relation to a representation of the previously defined node from which the additional node depends.

15. The computer storage medium of claim 12, wherein the operations further comprise:
receiving user input that defines one or more result nodes that each indicate that there has either been a taxable event for the commercial transaction or there has not been a taxable event for the commercial transaction, wherein each of the defined result nodes is dependent on a selected previously defined node.

16. The computer storage medium of claim 12, wherein the operations further comprise:
receiving user input that defines one or more error nodes that each indicate that the decision tree cannot find a valid result for a sequence of comparisons, wherein each of the defined error nodes is dependent on a selected previously defined node.

17. The computer storage medium of claim 12, wherein receiving the second user input that selects the yes answer node includes receiving user input that clicks on the yes answer node of the beginning test node.

* * * * *